(12) United States Patent
Liu et al.

(10) Patent No.: US 9,195,635 B2
(45) Date of Patent: Nov. 24, 2015

(54) TEMPORAL TOPIC SEGMENTATION AND KEYWORD SELECTION FOR TEXT VISUALIZATION

(71) Applicant: International Business Machines Corporation, Armonk, NY (US)

(72) Inventors: Shixia Liu, Beijing (CN); Shimei Pan, Elmsford, NY (US); Wei Hong Qian, Beijing (CN); Yangqiu Song, Fanling (HK); Fei Wang, Ossining, NY (US); Michelle X. Zhou, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 334 days.

(21) Appl. No.: 13/793,020

(22) Filed: Mar. 11, 2013

(65) Prior Publication Data

US 2014/0019119 A1    Jan. 16, 2014

Related U.S. Application Data

(60) Provisional application No. 61/671,268, filed on Jul. 13, 2012.

(51) Int. Cl.
   *G06F 17/21*    (2006.01)
   *G06F 17/22*    (2006.01)

(52) U.S. Cl.
   CPC ............ *G06F 17/21* (2013.01); *G06F 17/2229* (2013.01)

(58) Field of Classification Search
   None
   See application file for complete search history.

(56) References Cited

U.S. PATENT DOCUMENTS

| 8,245,135 | B2 | 8/2012 | Cai et al. | |
|---|---|---|---|---|
| 2007/0005296 | A1* | 1/2007 | Beresniewicz et al. | 702/181 |
| 2007/0129942 | A1* | 6/2007 | Ban et al. | 704/235 |
| 2008/0104048 | A1* | 5/2008 | Surendran | 707/5 |
| 2008/0126408 | A1* | 5/2008 | Middleton | 707/104.1 |
| 2010/0125604 | A1* | 5/2010 | Martinez et al. | 707/784 |
| 2010/0306249 | A1* | 12/2010 | Hill et al. | 707/769 |
| 2011/0208733 | A1* | 8/2011 | Boss et al. | 707/728 |

OTHER PUBLICATIONS

Crowdflower, Copyright 2013, Crowdflower, Inc., 2111 Mission Street, Suite 302, San Francisco, CA 94110, pp. 1-6, http://crowdflower.com/overview.

Allan, J. 2002. "Introduction to Topic Detection and Tracking". In Information Retrieval Series, Croft, B. Ed., Springer US, pp. 1-16, abstract only.

Alonso, O., Gertz, M. and Baeza-Yates, R., Nov. 2009. "Clustering and Exploring Search Results using Timeline Constructions". CIKM'09, 97-106.

Andrzejewski, D., Zhu, X., Craven, M., and Recht, B., Oct. 2011. "A Framework for Incorporating General Domain Knowledge into Latent Dirichlet Allocation using First-Order Logic". IJCAI'2011, 1171-1177.

(Continued)

*Primary Examiner* — Jeremiah Bryar
(74) *Attorney, Agent, or Firm* — Scully, Scott, Murphy & Presser, P.C.; Anne V. Dougherty, Esq.

(57) ABSTRACT

Visualizing content change of a data collection over time. A topic may be split into multiple linear, non-overlapping sub-topics along a timeline by satisfying a diverse set of semantic, temporal, and visualization constraints simultaneously. For each derived sub-topic, a set of representative keywords may be automatically selected to summarize the main content of the sub-topic.

25 Claims, 15 Drawing Sheets

(56) References Cited

OTHER PUBLICATIONS

Andrzejewski, D., Zhu, X., and Craven, M., Jun. 2009. "Incorporating Domain Knowledge into Topic Modeling via Dirichlet Forest Priors". ICML '09 Proceedings of the 26th Annual International Conference on Machine Learning, pp. 25-32.
Banerjee, S. and Rudnicky, A., Sep. 2006. "A TextTiling Based Approach to Topic Boundary Detection in Meetings. In proceedings of the Interspeech". pp. 57-60.
Basu, S., Bilenko, M. and Mooney, R., Aug. 2004. "A Probabilistic Framework for Semi-Supervised Clustering". SIGKDD'04, 59-68.
Blei, D., Ng, A. and Jordan, M., Mar. 2003. "Latent Dirichlet Allocation". J. of Mach. Learn. Res., 3, 993-1022.
Blei, D., Lafferty, J., Jun. 2006. "Dynamic topic models". ICML'06, 113-120.
Basu, S., Banerjee, A., and Mooney, R. J., Jul. 2002. "Semisupervised clustering by seeding". ICML'02, 27-34.
Brants, T., Chen, F. and Tsochantaridis, I., Nov. 2002. "Topic-based document segmentation with probabilistic latent semantic analysis", CIKM' 02, 211-218.
Carenini, G., Ng, R. Pauls, A., Jan. 29-Feb. 1, 2006. "Interactive multimedia summaries of evaluative text". IUI'06, Sydney, Australia, pp. 124-131.
Chi, Y., Song, X., Zhou, D., Hino, K. and Tseng, B., Aug. 2007. "Evolutionary spectral clustering by incorporating temporal smoothness". SIGKDD'07, 153-162.
Chu, C.-S.J. Jul. 1995. "Time Series Segmentation: A Sliding Window Approach". Information Sciences, 85 (1), pp. 147-173, abstract only.
Chuang, J., Ramage, D., Manning, C., and Heer, J., May 2012. "Interpretation and trust: designing model-driven visualizations for text analysis". CHI'12, 443-452.
Cui, W., Liu, S., Tan, L., Shi, C., Song, Y., Gao, Z., Qu, H., and Tong, X., Dec. 2011. "Textflow: Towards better understanding of evolving topics in text". IEEE Trans. Vis. Comput. Graph. 17, 12 (2011), 2412-2421.
Dhillon, I., Mallela, S. and Modha, D., Aug. 2003. "Information Theoretic Co-Clustering". SIGKDD'03, 89-98.
Dredze, M., Wallach, H., Puller, D., and Pereira, F., Jan. 2008. "Generating Summary Keywords for Emails Using Topics". IUI'09, 199-206.
Galley, M., McKeown, K., Fosler-Lussier, E. and Jing., H., Jul. 2003. "Discourse Segmentation of Multi-party Conversation". ACL'03, 562-569.
Hearst, M., Jun. 1994. "Multi-paragraph segmentation of expository text". ACL'94, 9-16.
Hearst, M., Mar. 1997. "TextTiling: Segmenting text into multi-paragraph subtopic passages". Computational Linguistics, 23(1):33-64.
Jeong, M. and Titov, I., Oct. 2010. "Multi-Document Topic Segmentation". CIKM'2010, 1119-1128.
Liu, S., Zhou, M., Pan, S., Qian, W., Cai, W., Lian, X., Nov. 2009. "Interactive Topic-based Visual Text Summarization and Analysis", CIKM'09, 543-552.
Misra, H., Yvon, F., Jose, J. and Cappe, O., Nov. 2009. "Text segmentation via topic modeling: an analytical study". CIKM '09, 1553-1556.
Ramage, D., Manning, C. and Dumais, S., Aug. 2011. "Partially Labeled Topic Models for Interpretable Text Mining". SIGKDD'11, 457-465.
Sanampudi, S. and Kumari, G., Feb. 2010. "Temporal reasoning in natural language processing: a survey". Intl. J. of Comp. Apps., 1(4): 53-57, 2010.
Schrier, E., Dontcheva, M., Jacobs, C., Wade, G. and Salesin D., Jan. 2008. "Adaptive layout for dynamically aggregated documents". IUI '08, 99-108.
Song, Y., Pan, S., Liu, S., Wei, F., Zhou, M. and Qian, W., Jul. 2010. "Constrained co-clustering for textual documents". AAAI'2010, 581-586.
Sun, B., Mitra, P., Giles, C., Yen, J. and Zha, H., Jul. 2007. "Topic segmentation with shared topic detection and alignment of multiple documents". SIGIR'07, 199-206.
Tür, G., Stolcke, A., Hakkani-Tür, D. and Shriberg, E., May 2001. "Integrating prosodic and lexical cues for automatic topic segmentation", Computational Linguistics, 27(1), 31-57.
Wang, F., Tong, H. and Lin, C., Aug. 2011. "Towards Evolutionary Nonnegative Matrix Factorization". AAAI'11, 501-566.
Wang, C., Blei, D. and Heckerman, D., Feb. 2008. "Continuous Time Dynamic Topic Models". Proc. on Uncertainty in AI, 579-586.
Wang, F., Li, T. and Zhang, C., Jan. 2008. "Semi-Supervised Clustering via Matrix Factorization". SIAM'08, 1-12.
Wang, X. and McCallum, A. Aug. 2006. "Topics over time: a Non-Markov Continuous-Time Model of Topical Trends". SIGKDD'06, 424-433.
Wei, F., et al., Jul. 2010. "Tiara: A Visual Exploratory Text Analytic System". KDD'10, Jul. 25-28, 2010, pp. 1-10.

\* cited by examiner

TEMPORAL TOPIC SEGMENTATION AND KEYWORD SELECTION FOR TEXT VISUALIZATION

CROSS-REFERENCE TO RELATED APPLICATIONS

The present application claims the benefit of the U.S. Provisional Application No. 61/671,268, filed on Jul. 13, 2012, the entire content of which is incorporated herein by reference.

FIELD

The present application relates generally to computers, and computer applications, and more particularly to document segmentation and topic-based text visualization.

BACKGROUND

Document segmentation typically focuses on splitting a single document (e.g., the transcript of a 30-minute news story) into a linear sequence of segments, each of which represents a coherent sub-topic. There are a number of approaches to single document segmentation, such as detecting segmentation points by specific speech or lexical cues, identifying lexical or semantic changes between adjacent text blocks, and probabilistic topic segmentation. There is also research on taking multiple similar documents (e.g., multiple news articles from different sources reporting the same event) as an input. In such a case, topic segmentation is performed across multiple documents on the shared topics.

The existing body of work on temporal topic analysis incorporates temporal information as an input to improve topic discovery results. For example, a dynamic topic model groups documents by year, and shows how the topics in one year evolve from that of the previous year. In such a model, documents are first grouped by a fixed time frame (e.g., per year). A topic model is then used to derive multiple topics from the documents in each time frame.

Existing efforts in creating topic-based, interactive visual text summarization systems focus on developing visual metaphors and interactions that allow users to understand and explore the derived topics. Existing time-based visual summary approaches are often ad hoc. For example, the temporal segment boundaries are mainly determined by visual constraints, such as the peaks and valleys of a topic layer. If a topic layer has too few natural visual segment boundaries (i.e., the shape of the topic layer is mostly flat), as a heuristic, additional segment boundaries are then introduced using fixed time intervals. Nonetheless, such approaches cannot guarantee that the derived temporal segments capture all significant topic transitions or the prominent topics in a predetermined, fixed time interval. In sum, existing methods do not reveal topic segment explicitly and do not encode flexible temporal and visual constraints.

BRIEF SUMMARY

A method of visualizing content change of a data collection over time, in one aspect, may comprise receiving one or more topics derived from the data collection. The method may further comprise extracting a set of documents relevant to each topic from the data collection. The method may also comprise segmenting each topic into multiple non-overlapping temporal segments. The segmenting, in one aspect, may comprise generating temporal and visual constraints. The segmenting may also comprise deriving from the set of documents a set of document clusters that satisfy the temporal and visual constraints, a document cluster in the set of document clusters identified with a sub-topic. The segmenting may further comprise determining a temporal segment boundary associated with said document cluster, wherein the temporal segment boundary identifies a temporal segment for the sub-topic. The method may further comprise selecting a set of representative keywords from the document cluster to summarize the temporal segment. The method may also comprise generating a time-based, interactive visual summary of the data collection.

A system for visualizing content change of a data collection over time, in one aspect, may comprise a document pre-processing module operable to execute on a processor, and further operable to extract text and associated meta data from a collection of documents. A topic summarization module may be operable to automatically extract a set of topics based on the extracted text and associated meta data. A topic segmentation module may be operable to split a topic in the set of topics into multiple, non-overlapping temporal segments, wherein content for visualization is generated. A text visualization module may be operable to generate a time-based, interactive visual text summary based on the content. The topic segmentation module may be further operable to generate temporal and visual constraints. The topic segmentation module may be further operable to derive from the collection of documents a set of document clusters that satisfy the temporal and visual constraints, a document cluster in the set of document clusters identified with a sub-topic. The topic segmentation module may be further operable to determine a temporal segment boundary associated with the document cluster, wherein the temporal segment boundary identifies a temporal segment for the sub-topic. The topic segmentation module may be further operable to select a set of representative keywords from the document cluster to summarize the temporal segment.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

In the present disclosure in one embodiment, several aspects in intelligent visualization are addressed, for instance, segmenting a collection of heterogeneous documents along the timeline. Another aspect that may be addressed is identifying optimal temporal segment boundaries satisfying semantic, temporal and visual constraints.

A topic-based, intelligent text visualization methodology and system (also referred to as a tool) are presented that may aid users in analyzing large collections of text, e.g., collections of documents. The methodology and system in one embodiment may utilize constraint-based approach to temporal topic segmentation, e.g., to help users quickly discover fine-grained content evolution and significant content transitions within a topic over time. Thus, e.g., the methodology and system may visualize content evolution over time. An interactive visual text analysis capability provided in the methodology of the present disclosure may also aid users in effectively gleaning insights and locating critical information from large collections of text documents. In one aspect, a methodology of the present disclosure may split a topic into multiple linear, non-overlapping sub-topics along a timeline by satisfying a diverse set of semantic, temporal, and visualization constraints simultaneously. For each derived sub-topic, the methodology may also automatically select a set of representative keywords to summarize the main content of the sub-topic.

A methodology of the present disclosure may include a function that automatically generates a time-based visual text summary that conveys key topics derived from a large collection of text. Another function provided in the present disclosure may include supporting a set of interactions that allow users to further interpret the created summary and examine the text collection from multiple aspects.

Figure 1:
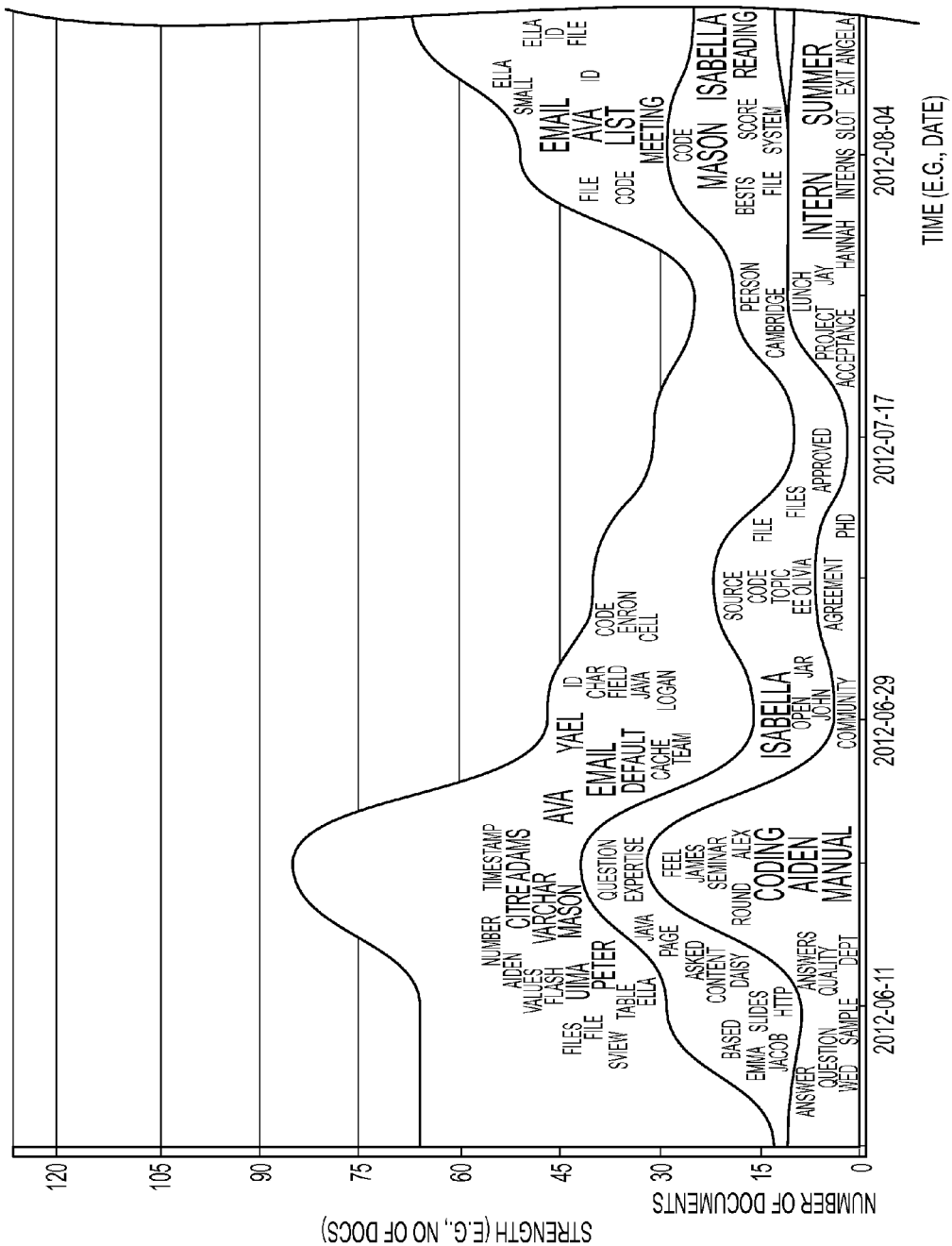
FIG. 1 illustrates an output of a methodology of the present disclosure, in which each colored layer represents an automatically derived topic.
Figure 1:
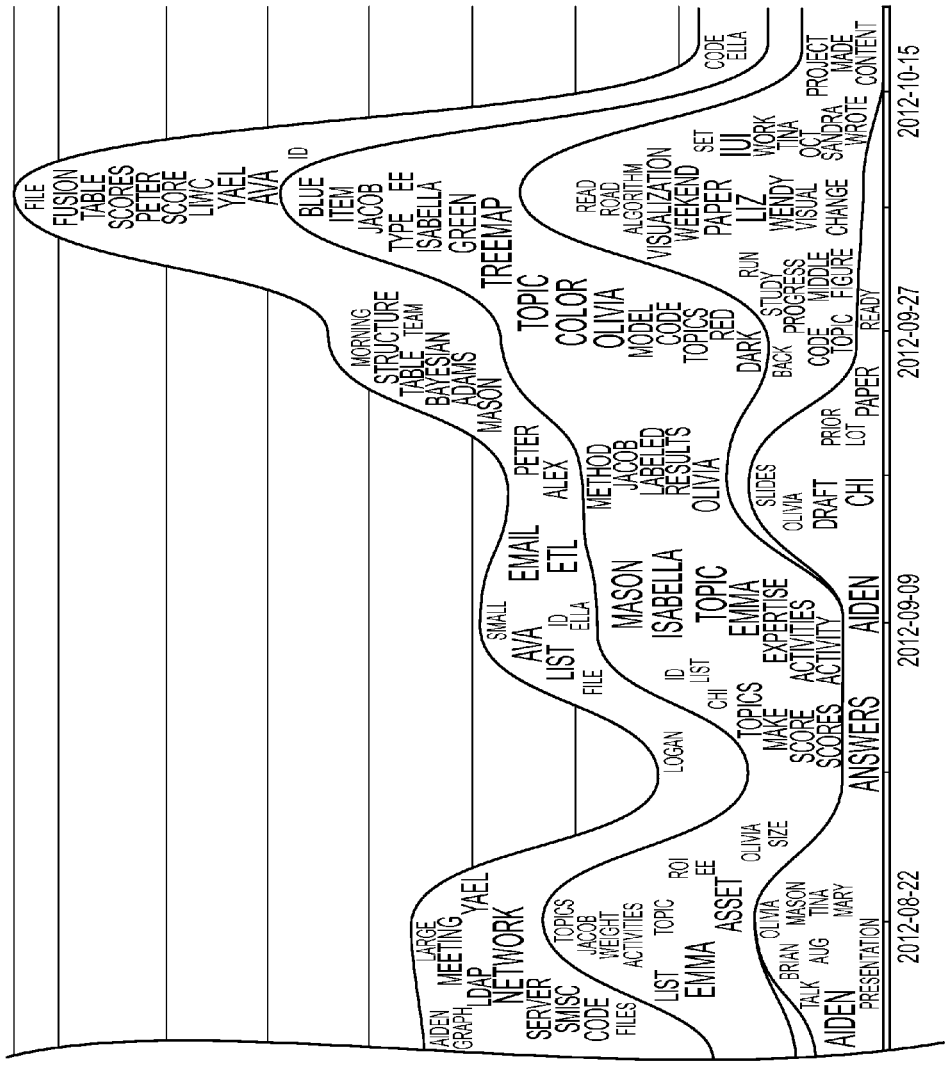

FIG. 1 illustrates an example visualization, in which each colored layer represents an automatically derived topic. In this example, x-axis encodes time and y-axis encodes the volume of the content (e.g., a sum of all the topic-related content at a particular time point). Layers (or derived topic) may be differentiated using other visualization than color. Each layer represents a specific topic current, which is annotated with a set of keywords. Topic keywords are distributed along time, summarizing the content evolution of each topic over time. In this example, each layer is depicted by a set of word clouds, summarizing the topic content and its evolution over time. Briefly, word cloud refers to visual representation of text data. At each time point (shown as x-axis), the height of a layer encodes the "strength" of the topic, e.g., in this example, the number of documents covering the topic at that time, shown as y-axis. A user can also interact with this visualization, e.g., retrieving the text snippets containing a particular keyword in a topic.

The topics are automatically derived by performing topic extraction and temporal topic segmentation tasks. Topic extraction is to analyze a text collection (e.g., news articles) and automatically derive a set of topics (e.g., sports and politics). Temporal topic segmentation is to break an extracted topic into a set of sub-topics along the time line so that a user can easily track the temporal evolution of the topic. Topic extraction may include clustering and probabilistic topic modeling. In one embodiment, the Latent Dirichlet Allocation (LDA) model may be used to automatically extract a set of topics from a text collection.

A methodology of the present disclosure provides a mechanism to temporally segment a continuous topic to create an effective, time-based visual summary, e.g., enhancing the above-described visualization methodology. Segmenting a continuous topic for effective temporal visualization (also referred to as temporal topic segmentation) further may comprise two steps. First, it identifies a set of meaningful, time-based topic transitions in a topic so that the topic can be broken into multiple linear but non-overlapping temporal segments to be displayed on a timeline. Second, it extracts a set of representative keywords to be displayed on the time line for summarizing the content of each segment. A diverse set of constraints, including semantic, visual, and temporal constraints, are satisfied to produce an effective, time-based visualization.

Figure 2A:
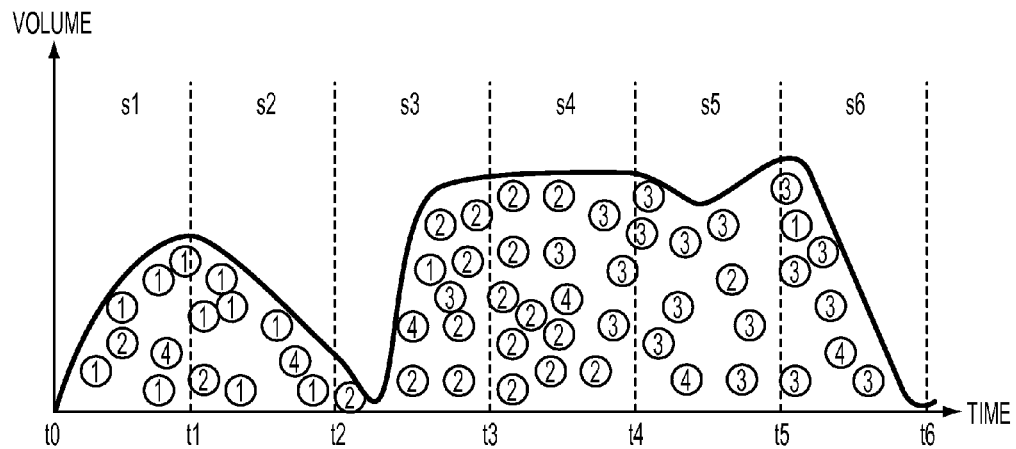
FIGS. 2A and 2B illustrate examples of temporal topic segmentation in which each numbered circle denotes a document in a specific sub-topic.
Figure 2B:
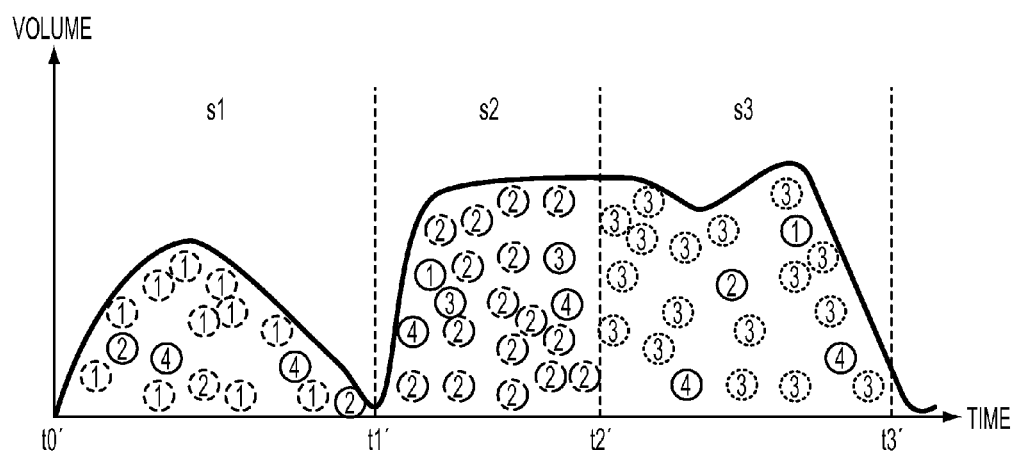

Constraint 1: Capturing significant topic transitions. In one embodiment, a methodology of the present disclosure may help users detect how a topic evolves over time, in particular, identify whether and how the content of a topic has shifted and when. Most existing time-based visual text summaries split a topic into multiple temporal segments by a fixed time interval (e.g., monthly). In reality, however, the semantic transition points of a topic may not line up with a pre-determined, fixed time interval. For instance, FIGS. 2A and 2B illustrate temporal topic segmentation in which each numbered circle denotes a document in a specific sub-topic. In FIG. 2A, segmentation (s1-s6) is shown by fixed time intervals (t1-t6). As seen in FIG. 2A, topics do not line up with fixed segments. In such cases, chopping up a topic "unnaturally" along fixed time points not only would miss the natural topic transitions, but may also result in visual redundancies. For example, segments s1 and s2 contain the similar content in FIG. 2A. FIG. 2B shows optimized segmentation (s1-s3). To effectively capture topic transitions, ideally a temporal segment boundary should be placed near where a significant topic shift occurs, e.g., t1' in FIG. 2B.

Constraint 2: Identifying sub-topics with temporal locality. To effectively visualize topic transitions over time, a methodology of the present disclosure in one embodiment may discover sub-topics that exhibit temporal locality. Temporal locality of a topic is a time interval where the documents covering the topic appear most prominently. Prominence may be determined based on frequency of occurrence in a temporal interval in one embodiment of the present disclosure. As shown in FIG. 2A, for example, sub-topic 4 does not have temporal locality, since the documents on this topic are distributed over the entire time span. In contrast, the temporal locality of sub-topic 1 is time interval t0-t2.

Constraint 3: Respecting visual segment boundaries. As shown in FIG. 1, word clouds representing topic segments are placed in a topic layer. To best use the available space in each topic layer, a spatial layout algorithm is often used to place the keywords in the formed peaks and valleys. However, the temporal localities of sub-topics may not be aligned with these visual peaks and valleys. For example, the preferred temporal boundary for sub-topic 1 is t0-t2 in FIG. 2A, which does not line up with the visual boundary t0'-t1' in FIG. 2B. If natural visual shapes is not respected, the space use may not be optimal (e.g., placing the keywords for sub-topic 1 in t0-t2 versus t0'-t1'). Moreover, placing a word cloud representing the same topic across visual boundaries will disrupt the visual flow. For example, sub-topic 2 spans t2-t4, across the natural visual boundary at t1'. Ideally, temporal and visual boundaries should be aligned to produce a semantically coherent and visually pleasing display. Using the above examples, segmenting the topic at t1' is preferable than at t2.

A methodology of the present disclosure in one embodiment incorporates an optimization-based approach to temporal topic segmentation of document collections (data) or the like, including the selection of representative keywords for summarizing each identified temporal segment, e.g., for segment annotation. The approach in one embodiment systematically incorporates a set of constraints, including semantic, temporal, and visual constraints, e.g., described above. It then satisfies them simultaneously to optimize topic segmentation and keyword selection. For instance, a keyword selection method may automatically annotate the content of each derived temporal segment, e.g., providing a systematic approach to select representative keywords for segment annotation.

The disclosed optimization-based approach to temporal topic segmentation is effective, as it satisfies a diverse set of semantic, temporal, and visualization constraints for creating a time-based, visual text summary. For instance, the approach is topic-based, and thus it can preserve topic coherence and cohesion; it can systematically incorporate temporal constraints so that the derived topics can demonstrate temporal locality, and discovered topics may be presented in linear non-overlapping manner; it can systematically incorporate visual constraints so that the derived temporal segment boundaries can be aligned with visual segment boundaries. In another aspect, the disclosed constraint-based framework is extensible, e.g., can incorporate additional constraints when needed (e.g., geo-spatial constraints that group together segments originating from the same geo-location). For example, the methodology may be applied to topic-based spatial summarization of text documents (e.g., on a United States map) with additional geo-constraints.

Figure 3A:
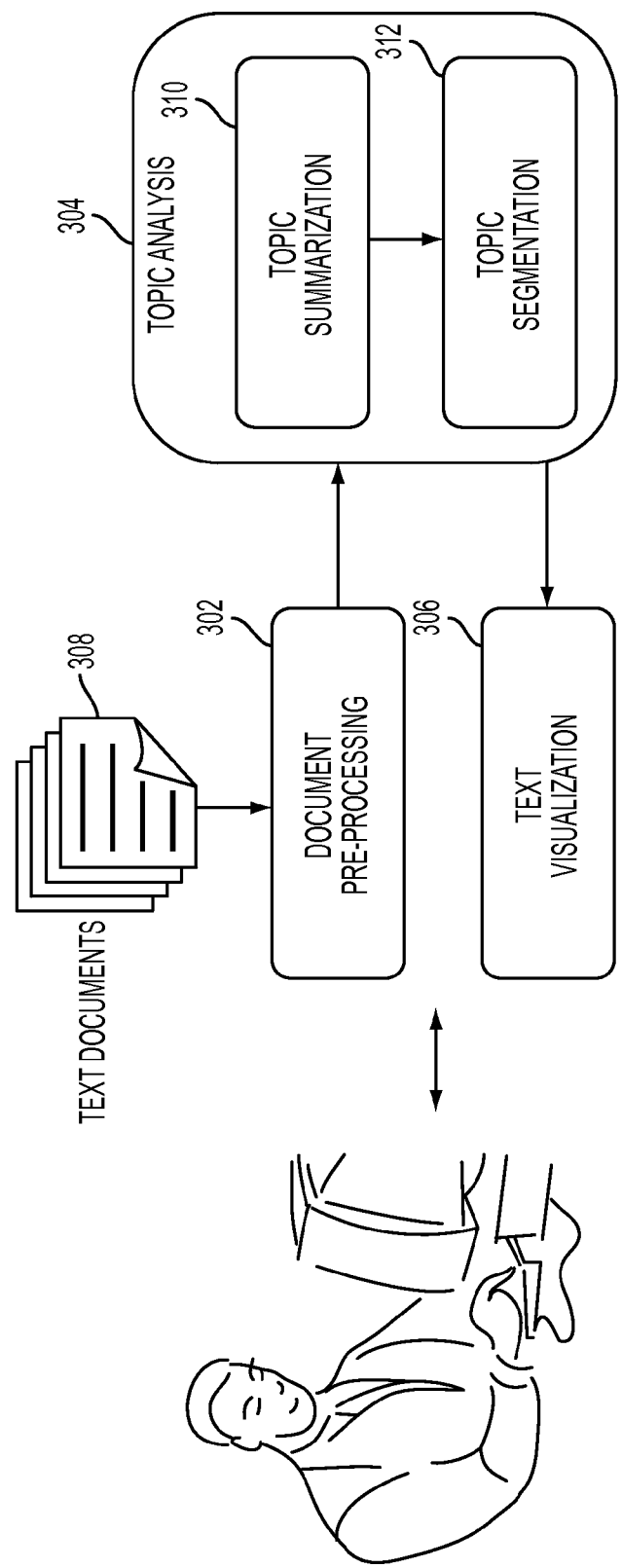
FIGS. 3A and 3B illustrate an overview of a system in one embodiment of the present disclosure.

FIG. 3A illustrates an overview of a system in one embodiment of the present disclosure. The system may comprise a document pre-processing module 302, a topic analysis module 304, and a text visualization module 306. The input to the system (e.g., implemented as a tool a user may use) includes a collection of text documents 308. In one embodiment, the document pre-processing component 302 first extracts the main body text (e.g., the body of a news story) and related meta data (e.g., the author and time information) from each document 308. The extracted information is then sent to the topic analysis component 304, which generates the content for visualization. The topic summarization component 310 may use an extraction algorithm, e.g., an LDA-based approach to automatically extract a set of topics. Each derived topic is associated with a set of probabilistic measurements, such as the probability of a document and/or keyword related to the topic. For each derived topic, the topic segmentation component 312 splits the topic into multiple linear, non-overlapping temporal segments. Given the derived topics and topic segments, the text visualization 306 component generates a time-based, interactive visual text summary. Users can interact with the generated visualization to further their analysis.

Topic segmentation performed, e.g., by the topic segmentation module 312 may comprise a process that uses constraint-based topic analysis to identify temporal segment boundaries of a given topic, and a keyword selection approach, which selects a set of representative keywords to summarize each derived temporal segment. In one aspect, the process that uses constraint-based topic analysis may comprise a three-step process described below.

As an example, a problem and key terminologies associated with the topic segmentation may be formally defined as follows. Given a topic S over time T, the task of temporal topic segmentation is to identify a set of segments $\{S_1, \ldots, S_K\}$ and their respective temporal boundaries $\{t(S_1), \ldots, t(S_K)\}$, where $S_i$ is a sub-topic of S, $t(S_i) \subset T$, and $t(S_i) < t(S_j)$, if $i < j$. Moreover, the identified segments and their temporal boundaries must satisfy a set of additional constraints, including semantic, visualization and other temporal constraints. A methodology of the present disclosure may model the task as constraint-based topic analysis with two steps. For example, the methodology of the present disclosure may first identify temporal segments that satisfy diverse topic, temporal and visual constraints. The methodology may then extract the representative keywords for each identified segment.

Figure 3B:
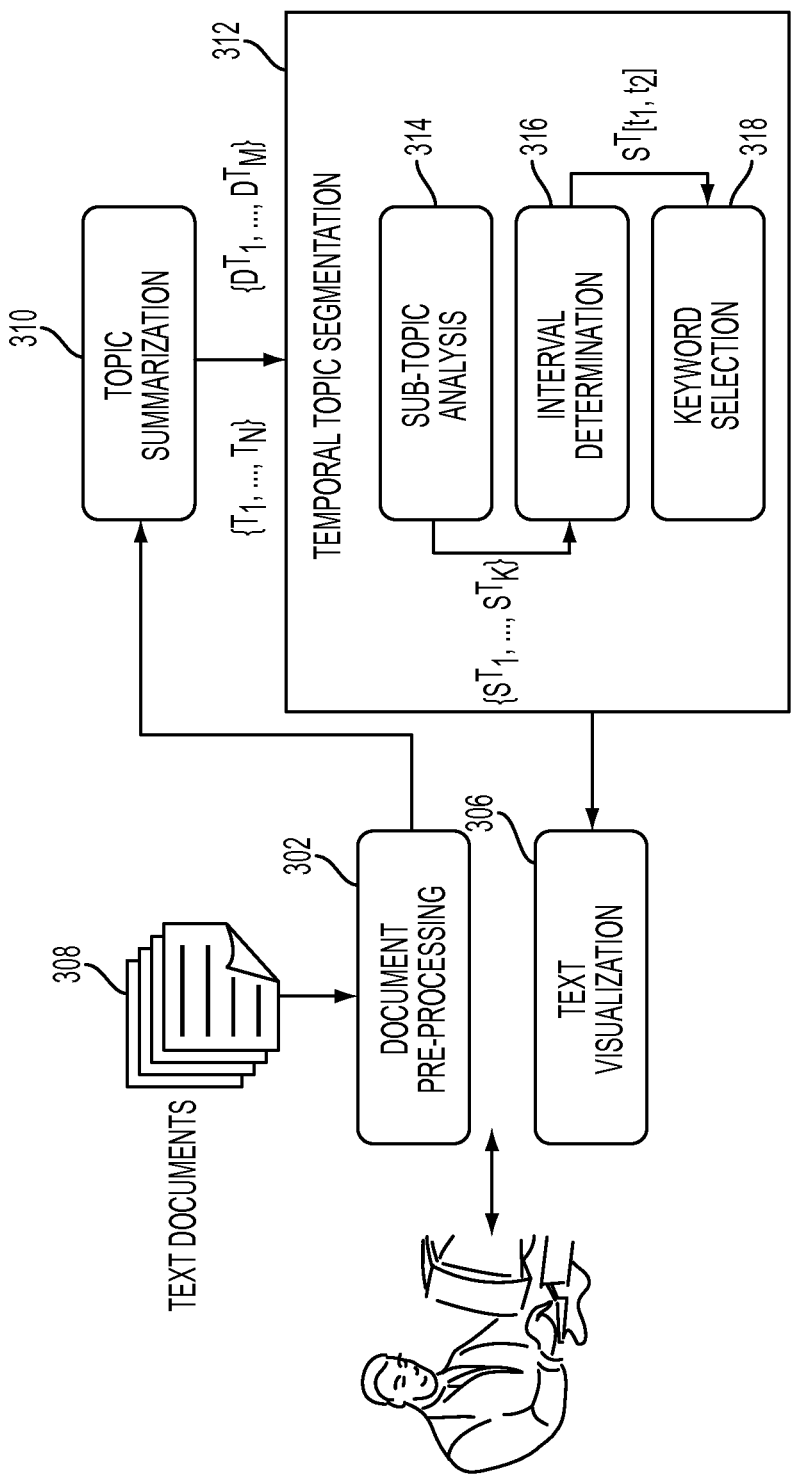

FIG. 3B illustrates an overview of a system in one embodiment of the present disclosure in another aspect. The input to a system is a collection of text documents 380. The document pre-processing component 302 extracts the title and the main body text (e.g., the body of a news story) and related meta data (e.g., the author and time information) from each document 308. The extracted information is then sent to the topic summarization component 310, which may for example use an LDA-based approach to automatically extract a set of topics. Each derived topic is associated with a set of documents. Given a derived topic (T) and a set of documents covering the topic $\{D^T_1, \ldots, D^T_M\}$, a sub-topic analysis component 314 identifies a set of sub-topics $\{S^T_1, \ldots, S^T_K\}$ that satisfy a set of semantic, temporal, and visualization constraints. An interval determination component 316 computes the temporal boundary for each sub-topic $S^T$ [t1, t2]. A keyword selection component 318 identifies a set of keywords to represent each derived sub-topic. Given the derived topics and sub-topics, the text visualization component 306 generates a time-based, interactive visual text summary.

Temporal Segmentation

In one embodiment of the present disclosure, temporal segmentation may comprise: (1) constraint generation, (2) topic analysis with the generated constraints, and (3) temporal boundary determination based on the topic analysis results.

Step 1: Generating Visual and Temporal Constraints

In one embodiment of the present disclosure, the identified segments (sub-topics) satisfy a set of semantic, temporal, and visual constraints to ensure the generation of an effective visualization. Since an embodiment of the present disclosure employs a topic analysis-based approach for segmentation and keyword selection (e.g., clustering or LDA), latent semantic constraints have already been taken into account. In the present disclosure in one embodiment, visual and temporal constraints are additionally encoded. To incorporate these constraints into a constraint-based topic modeling process, the methodology of the present disclosure in one embodiment represents them as must-links and cannot-links between a pair of documents. In general, these links enforce specific relationships between two data entities (e.g., documents). More specifically, must-link ensures that related entities be in the same sub-topic (e.g., documents A and B should be in the same sub-topic), while cannot-links indicate that related entities should not be associated with the same sub-topic (e.g., documents C and D should belong to different sub-topics).

Given a topic derived from a text collection, the methodology of the present disclosure may first extract a set of documents D that is relevant to the topic. For each document pair $d_i$ and $d_j$ in D, the methodology of the present disclosure in one embodiment adds a must-link or a cannot-link as follows:

(1) Adding a cannot-link between $d_i$ and $d_j$ if they fall in different visual segments. Here visual segment boundaries are computed by a visualization component prior to topic segmentation (e.g., t1' in FIG. 2B is a visual segment boundary that separates the visualization into two visual segments). Since each document is associated with a time stamp, the time stamp is used to determine which visual segment the document falls in. Whenever possible, the methodology of the present disclosure in one embodiment may place the keywords representing a sub-topic in a single visual segment instead of across the boundaries. To achieve, the added cannot-links discourage documents falling in different visual segments to form the same sub-topic.

(2) If the temporal distance between the two documents is within a threshold ə (e.g., within a week), add a must-link between them. These must-links encourage documents that are temporally close to each other to be in the same sub-topic. As a result, these constraints help determine the temporal locality of sub-topics.

(3) Otherwise, if the temporal distance between the two documents is above a threshold Δ (e.g., above 6 months), add a cannot-link between them. These cannot-links will prevent temporally distant documents from being placed in the same sub-topic. In other words, these links discourage the formation of sub-topics that do not exhibit temporal locality.

Here, thresholds ə and Δ are the thresholds used to define the temporal proximity of two documents. Both values may be set empirically based on the properties of the target dataset (e.g., the time span and the distribution of document in the entire data set).

There may be instances where multiple constraints may co-exist between a pair of documents. For example, two documents fall in two visual segments, so a cannot-link will be added. Since they are also temporally close enough, a must-link will also be added because of their temporary proximity. In such cases, the methodology of the present disclosure in one embodiment assigns priority to different constraints. In one embodiment, the priority may be given to visual constraints. The rationale may be that the number of visual constraints is far fewer than the number of the temporal constraints. In one aspect, a heuristic of the present disclosure may promote more specific visual constraints and prevents them from being overpowered by more general temporal constraints.

After the must-links and cannot-links are generated, the methodology of the present disclosure in one embodiment may employ constraint-based topic analysis to derive sub-topics that satisfy these constraints.

Step 2: Performing Constraint-Based Topic Analysis

To incorporate the visual and temporal constraints specified above in a topic modeling process, the methodology of the present disclosure in one embodiment may employ constraint-based topic analysis. There are two families of constraint-based topic analysis: (a) Constrained LDA and (b) constrained clustering.

Constrained clustering is a class of semi-supervised clustering algorithms that allows a system to incorporate additional user or application constraints during clustering. Frequently, these constraints are soft constraints and not all of them will be satisfied in the final solution. In general, constrained clustering is formulated as constraint-based optimization where its objective function captures both cluster coherence and additional application-specific constraints. This property of constrained clustering fits into the constraint-based topic analysis of the present disclosure, since it can ensure semantic coherence of clustered sub-topics while satisfying additional temporal and visual constraints whenever possible.

Among the constrained clustering algorithms, the methodology of the present disclosure in one embodiment may adopt constrained co-clustering for several reasons. First, it is flexible as it can cluster multiple variables simultaneously. Traditional constrained clustering methods that cluster one random variable at a time are special cases of constrained co-clustering methods. Second, it is more effective in topic analysis than one dimensional clustering, since it can cluster documents and words jointly. In one embodiment of the present disclosure, the following clustering frameworks may be utilized: Constrained Information-Theoretic Co-Clustering (CITCC) and Constrained Co-Clustering with Non-negative Matrix Tri-Factorization (CCCTriNMF). CITCC combines the benefits of information-theoretic co-clustering with constrained clustering for textual documents. It utilizes a two-sided hidden Markov random field to model both the document and word constraints. In CITCC, the constraints are encoded as "must-links" and "cannot-links and constrained co-clustering is formulated as constraint-based optimization with the objective function:

$$\operatorname{argmin} D_{KL}(p(D, V, \hat{D}, \hat{V}) \| q(D, V, \hat{D}, \hat{V}) + \qquad (1)$$

$$\sum_{d_{m_1}}^{M} \sum_{d_{m_2} \in M_{d_{m_1}}} E(d_{m_1}, d_{m_2} \in M_{d_{m_1}}) +$$

$$\sum_{d_{m_1}}^{M} \sum_{d_{m_2} \in C_{d_{m_1}}} E(d_{m_1}, d_{m_2} \in C_{d_{m_1}}) +$$

$$\sum_{v_{i_1}}^{V} \sum_{v_{i_2} \in M_{v_{i_1}}} E(v_{i_1}, v_{i_2} \in M_{v_{i_1}}) + \sum_{v_{i_1}} \sum_{v_{i_2} \in C_{v_{i_1}}} E(v_{i_1}, v_{i_2} \in C_{v_{i_1}})$$

where $D=\{d_1, \ldots, d_M\}$ and $V=\{v_1, \ldots, v_V\}$ are the set of documents and words, $\hat{D}$ and $\hat{V}$ are the document and word cluster sets, $M_{d_m}$ and $C_{d_m}$ are the must-link and cannot-link sets on the latent document cluster label $L_{d_m}$ for document $d_m$. Similarly, $M_{v_i}$ and $C_{v_i}$ are the must-link and cannot-link sets on the latent word cluster label $L_{v_i}$ for word $v_i$, E is the energy function for must-links and cannot-links.

In contrast, CCCTriNMF is matrix-factorization-based, constrained co-clustering. Similar to CITCC, the constraints are encoded as must-links and cannot-links. It tries to find a solution to solve the following objective:

$$\operatorname*{Min}_{G_1 \geq 0, G_2 \geq 0} \|R_{12} - G_1 S G_2^T\|^2 + Tr(G_1^T \Theta_1 G_1) + Tr(G_2^T \Theta_2 G_2) \qquad (2)$$

where $R_{12}$ is a co-occurrence matrix of documents and words, $G_1$ and $G_2$ are the cluster indicator matrices for word and document. $Tr(G_1^T \Theta_1 G_1)$ and $Tr(G_2^T \Theta_2 G_2)$ are the penalties for violating the must-link and cannot-link constraints of words and documents, and $\Theta_1$ and $\Theta_2$ are the penalty matrices.

Applying constrained clustering using CITCC and CCCTriNMF with the constraints generated in Step 1, in Step 2 the methodology of the present disclosure in one embodiment may derive a set of document and word clusters.

Other clustering algorithms may be utilized, e.g., constrained K-means and/or constrained LDA.

Step 3: Determining Temporal Boundaries

Although Step 2 derives a set of document clusters, the clusters have not yet been assigned temporal boundaries. In Step 3, the methodology of the present disclosure in one embodiment may employ two methods to determine the temporal boundaries of derived document clusters: (1) by cluster centers and radiuses, and (2) by smoothed labels.

Figure 4:
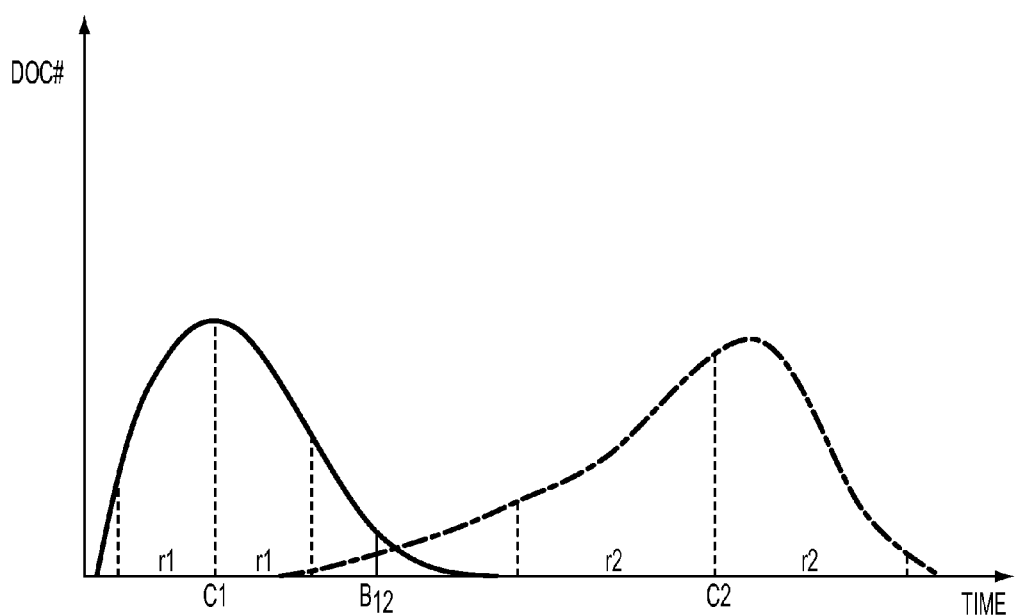
FIG. 4 shows the cluster centers and radiuses of two document clusters.

Cluster Center and Radius-based (CR): Based on the constrained clustering results, the methodology of the present disclosure in one embodiment may extract the temporal center and the temporal radius for each derived document cluster. The temporal center c of a cluster is defined as the median time stamp after sorting all the documents in the cluster on the time line, half of them is before c and half is after c. The temporal radius r of a cluster is used to define a range [c−r, c+r] so that x % of the documents in the cluster are within that range. Normally, x is set empirically based on the target data set. FIG. 4 shows cluster center and radius-based segmentation, in which the cluster centers and radiuses of two document clusters are shown.

To associate the clusters with time, the methodology of the present disclosure in one embodiment may sort all the clusters on the time line based on their temporal centers. The segment boundary between two adjacent clusters $c_1$ and $c_2$ is determined based on their cluster radiuses. Given distance d (time distance) between the centers of two adjacent clusters, the segment boundary $b_{1,2}$ is decided by:

$$b_{1,2} = c_1 + \frac{r_1}{r_1 + r_2} \times d \tag{3}$$

Since the size of the derived clusters can be imbalanced (e.g., some clusters are with thousands of documents, while others may only have a few), the methodology of the present disclosure in one embodiment may perform smoothing to remove clusters that are "too small to visualize effectively". For example, the methodology of the present disclosure in one embodiment may consider a cluster whose size is less than a predefined size to be "too small to visualize", e.g., 10% of the average cluster size "too small to visualize". Cluster size may be measured by the number of documents it contains, or the length of the documents contained therein.

Smoothed Label-based (SL). A second approach is to use a sliding window to determine temporal boundaries of the derived clusters. In this approach, the methodology of the present disclosure in one embodiment may first directly sort all the documents on the timeline based on their time stamps. The methodology of the present disclosure in one embodiment may then use a sliding window of size N to examine N documents at a time and identify those whose cluster labels do not conform to the main cluster where the majority lies. Majority, for example, may be considered as those with greater number or more than half of the total. Such a document is then reassigned to the main cluster within the window. Consider an example scenario in which 10 emails were sent out yesterday E1, E2, . . . , E10, sorted from the earliest to the latest. Assume these emails are about 5 different topics (e.g., T1, T2, . . . , T5), if E1 is about topic T5, then T5 is the cluster label of E1. Assume the cluster labels for the 10 emails are: T5, T5, T5, T2, T1, T3, T3, T3, T3, T4. Also assume the window size is 4. Looking at the emails within the current window (E1-E4), three out of four are about topic T5, and therefore, the main/majority cluster for the current window is T5. Since E4's cluster label (T2) is not the same as the majority cluster label, it is changed to T5. Next, the window is slid by one email, and the window having emails E2-E5 is inspected, the same process repeated until all the emails are processed. Based on the smoothed document labels, a temporal boundary occurs whenever there is a change of cluster labels between two adjacent documents on the time line. N may be set empirically based on the target dataset. In general, larger window size will result in smaller number of clusters. Similar to the CR-based algorithm, "small clusters" may be removed during SL segmentation due to "smoothing".

Selection of Representative Segment Keywords

After Step 3, each document cluster is now associated with a temporal boundary, which is called a temporal segment. For each temporal segment, the methodology of the present disclosure in one embodiment may select a set of topic keywords to best summarize the documents in the cluster. The method for selecting topic keywords may vary, e.g., depending on which clustering algorithm is used.

For example, for CITCC, the rank of a word $v_i$ is computed using:

$$r_{v_i \in S} = \sum_{k_v} q(\hat{d}_{k_d}, \hat{v}_{k_v}) q(v_i | \hat{v}_{k_v}) \tag{4}$$

For each word $v_i$ in any of the documents in segment S, the methodology of the present disclosure in one embodiment may compute the rank of the word $r_{v_i}$ formula (4) where $\hat{d}_{k_d}$ is the document cluster associated with segment S, $q(\hat{d}_{k_d}, \hat{v}_{k_v})$ is the probability of a word cluster $\hat{v}_{k_v}$, $k_v=1, 2, 3 \ldots, K$, be associated with the document cluster $\hat{d}_{k_d}$, and $q(v_i|\hat{v}_{k_v})$ is the probability a word $v_i$ is associated with the word cluster $\hat{v}_{k_v}$.

To improve efficiency, the methodology of the present disclosure in one embodiment may focus on the most relevant word clusters. The relevant word clusters for a document cluster $\hat{d}_{k_d}$ are defined as those whose $q(\hat{d}_{k_d}, \hat{v}_{k_v})$ is above a certain threshold.

For CCCTriNMF, the rank of a word $v_i$ is computed using:

$$r_{v_i} = [S \cdot G_2^T]_{k,i} \tag{5}$$

where S is the cluster center matrix in equation (2), $G_2^T$ is the transpose of the word cluster indicator matrix, k is the cluster label associated with the current segment, and i is the word index of $v_i$.

Based on the word ranks defined in one or more of equations (4) and (5), the methodology of the present disclosure in one embodiment may retrieve the top-K keywords to represent each segment.

Figure 9:
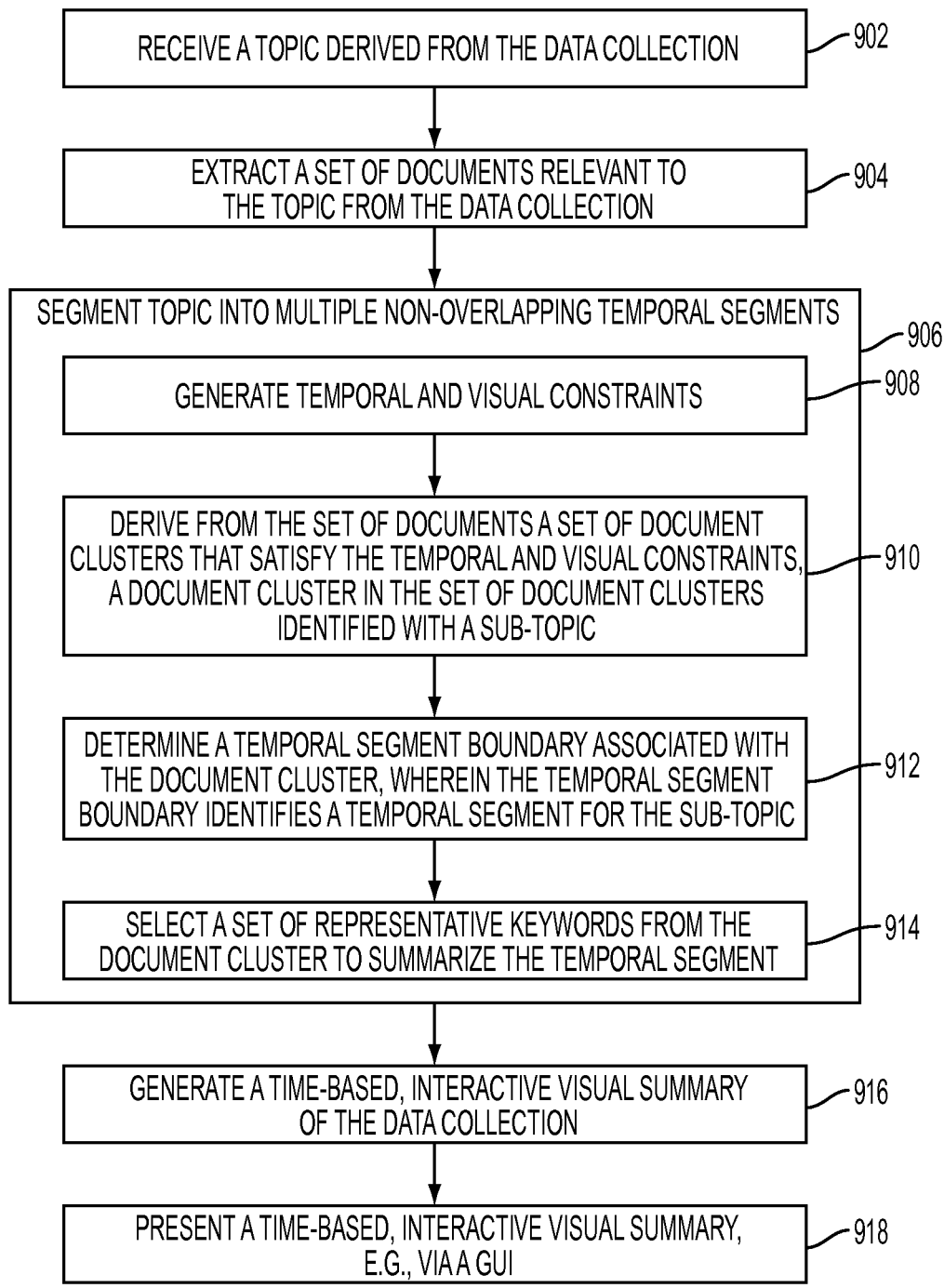
FIG. 9 is a flow diagram illustrating a method of the present disclosure in one embodiment.

FIG. 9 is a flow diagram illustrating a method of the present disclosure in one embodiment. The method, for example, employs the above described algorithm. At 902, a topic derived from a data collection, e.g., text collection is received. For instance, a set of topics in the data collection may be extracted or received. The following method may be performed for each topic identified in the data collection.

At 904, a set of documents relevant to the topic is extracted from the data collection. At 906, the topic may be segmented into multiple non-overlapping temporal segments. The segmenting may comprise at 908, generating temporal and visual constraints. This processing may be performed as described above with reference to generating visual and temporal constraints.

The segmenting may also comprise at 910, deriving from the set of documents a set of document clusters that satisfy the temporal and visual constraints. A document cluster in the set of document clusters is identified with a sub-topic. For instance, each document cluster has a sub-topic associated with it. This processing may be performed as described above with reference to performing constraint-based topic analysis.

The segmenting may also comprise at 912, determining a temporal segment boundary associated with the document cluster, wherein the temporal segment boundary identifies a temporal segment for the document cluster, e.g., identified with a sub-topic. This processing may be performed as described above with reference to determining temporal boundaries.

The segmenting may also comprise at 914, selecting a set of representative keywords from the document cluster to summarize the temporal segment. This processing may be performed as described above with reference to selection of representative segment keywords.

The method may further comprise at 916, generating a time-based, interactive visual summary of the data collection.

At 918, the time-based, interactive visual summary may be presented, e.g., via a graphical user interface.

The following describes the results of applying the above methodologies in different embodiments to test sets. However, the following description should not be construed as limiting the methodologies of the present disclosure disclosed herein in any way. To test the performance of the above-described approach, an extensive set of experiments was conducted to measure and compare the performance of the algorithms of the present disclosure in different settings by three objective metrics.

Data Sets

Two data sets were used in the experiments. The first data set is a collection of 7000+ emails over the course of two years. The second data set is a collection of 13,000+ New York Time news articles, published during the time period of six months.

Settings and Baseline

The system of the present disclosure first ran LDA topic modeling on each of the data set to derive N topics. For emails, N was set to 10. For news articles, N was set to 30. For each of the N topics, all the documents relevant to the topic were extracted. A document k is considered relevant to a topic i if its LDA-derived document topic probability $\theta_{k,i}$ is above a threshold; or if $\theta_{k,i}$ is the highest among all the $\theta_{k,j\ (j\neq i)}$ if none is above the threshold. In the experiments, the threshold was set to 0.4 for emails and 0.3 for news articles. For each LDA-derived topic, the temporal segmentation algorithms of the present disclosure were run. The same process was repeated 10 times, each with a different random seed for CITCC and CCCTriNMF. All the results presented here are the averages over 10 random runs across all the N topics.

For comparison purpose, a baseline that uses fixed interval method was included. This is the first and only method known to us that performs temporal topic segmentation for text visualization. The temporal boundaries in the baseline were determined first by natural visual segment boundaries, augmented with additional segments based on fixed time intervals to make the total number of segments the same as the document cluster number used by CITCC and CCCTriNMF in the methodology of the present disclosure. To select segment keywords, the baseline system computed the rank of a keyword in each temporal segment based on its segment-specific tf*idf scores. The top-K keywords were used for each segment.

Table 1 illustrates experimental results on two data sets. Except for visual alignment, all the numbers in bold represent significant improvement over the baseline. The bold numbers with * in visual alignment represent significant difference between the two segmentation algorithms under the same clustering conditions.

TABLE 1

| Method | Topic Completeness | | Topic Distinctiveness | | Alignment | |
|---|---|---|---|---|---|---|
| | Email | NYT | Email | NYT | Email | NYT |
| Baseline | .260 | .426 | .103 | .005 | .000 | .000 |
| CITCC-CR* | .561 | .575 | .079 | .111 | .082 | .050 |
| CITCC-SL* | .561 | .573 | .077 | .118 | .067 | .043 |
| CCCTriNMF-CR* | .440 | .494 | .128 | .147 | .097 | .066 |
| CCCTriNMF-SL* | .432 | .479 | .115 | .156 | .095 | .068 |

Metrics

Three objective metrics were used to evaluate the algorithms from two main aspects. The first two metrics, topic completeness and topic distinctiveness, evaluate how well the algorithm satisfies semantic coherence and temporal locality constraints. The third metric, visual alignment, measures how well the algorithm satisfies visualization constraints.

Topic Completeness measures how relevant the selected segment keywords are to the current topic. As shown in FIG. 1, the semantics of a topic is defined by the keywords associated with all the segments in the topic. Thus, one critical role played by these keywords is to help users understand the semantics of a topic. A high score in topic completeness indicates that it is easy for a user to grasp the overall semantics of a derived topic through the keywords in all temporal segments. In contrast, a low score implies that the extracted segment keywords may not be a good representation of the topic.

To compute topic completeness, for each topic, the union of all the keywords in all the derived segments (sub-topics) was compared with the original top 50 keywords derived by LDA for that topic. Based on the number of overlapping keywords, precision was computed to measure among all the keywords in the segment keyword union, the percentage of which also belongs to the top 50 topic keywords derived by LDA. Recall was computed to measure among all the top 50 keywords from LDA, the percentage of which also appears in the union of all the segment keywords. Finally, the F-measure was computed, the harmonic mean of precision and recall, as the overall assessment for topic completeness. The completeness score in Table 1 is the average F-measure over all the topics over 10 random runs.

Topic Distinctiveness is defined to measure how one segment differs from another based on their associated keywords. It helps to measure how well the temporal segments produced by the algorithm of the present disclosure captures significant topic transitions. Here, the average pair-wise Jensen-Shannon (JS) divergence was used to measure the distinctiveness of two sets of keywords. Suppose that a topic is segmented into L parts. Each segment l has a normalized keyword histogram $h_l$ s.t.

$$\sum_i h_l(i) = 1.$$

Given two normalized keyword histograms $h_i$ and $h_j$, first the Kullback-Leibler (KL) divergence is computed:

$$D_{KL}(h_i \| h_j) = \sum_{k=1}^{v} h_i(k) \log \frac{h_i(k)}{h_j(k)} \qquad (6)$$

Then the Jensen-Shannon (JS) divergence is computed:

$$D_{JS}(h_i \| h_j) = \frac{1}{2} D_{KL}(h_i \| \bar{h}) + \frac{1}{2} D_{KL}(h_j \| \bar{h}) \tag{7}$$

where $\bar{h} = \frac{1}{2}(h_i + h_j)$. The final distinctiveness score of a topic is the average pair-wise JS score over all the segments in a topic. After deriving the topic distinctiveness score for each topic, the average over all the topics over 10 random runs was computed.

Visual Segment Alignment measures how well the derived temporal segments align with visual segments. While the first two metrics evaluate the semantic coherence of derived temporal segments, this metric evaluates how well the algorithm of the present disclosure satisfies the visualization constraints. Here the visual segment boundaries were computed by the system of the present disclosure based on the generated visualization. The average distance was computed between each visual segment boundary and its nearest temporal segment boundary inferred by the algorithms of the present disclosure. The distance is normalized so that it is in the range of [0, 1]. Here, the lower the score (distance) is, the better the alignment is. The scores shown in Table 1 are the averages over all the visual segment boundaries for all the topics over 10 random runs.

Results and Analysis

As shown in Table 1, in terms of topic completeness, all the algorithms of the present disclosure outperformed the baseline on both data sets. The difference is statistically significant based on paired t-test ($p<0.001$). This result strongly suggests that by employing constrained clustering, the present disclosure's temporal topic segmentation including keyword selection is much more capable of identifying topic-related keywords. Low topic completeness score often means it is hard for users to grasp the semantics of a topic based on the sum of the segment keywords. Moreover, CITCC-based methods performed significantly better than CCCTriNMF-based methods ($p<0.001$).

For topic distinctiveness, CCCTriNMF-based approaches performed the best on both data sets. They performed significantly better than the baseline ($p<0.001$). They also performed significantly better than the CITCC-based methods ($p<0.001$). Note that the topic distinctiveness scores for the baseline system in both data sets are quite low (Table 1). Since the baseline used only visual boundaries and fixed time intervals to do segmentation, this may be caused by the redundancies of splitting similar content into multiple segments (e.g., S1 and S2 in FIG. 2A). For visual segment alignment, since by definition, the alignment score for the baseline is always 0, the results were not compared with the baseline. Instead, the performances were compared between the two temporal alignment algorithms (i.e., CR versus SL) under the same clustering condition. Based on paired-t test, if used in combination with CITCC, the SL-based algorithm performed significantly better than the CL-based method on both datasets ($p<0.001$). There is no statistically significant difference between these two approaches, if they were used in combination with the CCCTriNMF-based algorithms.

Figure 5A:
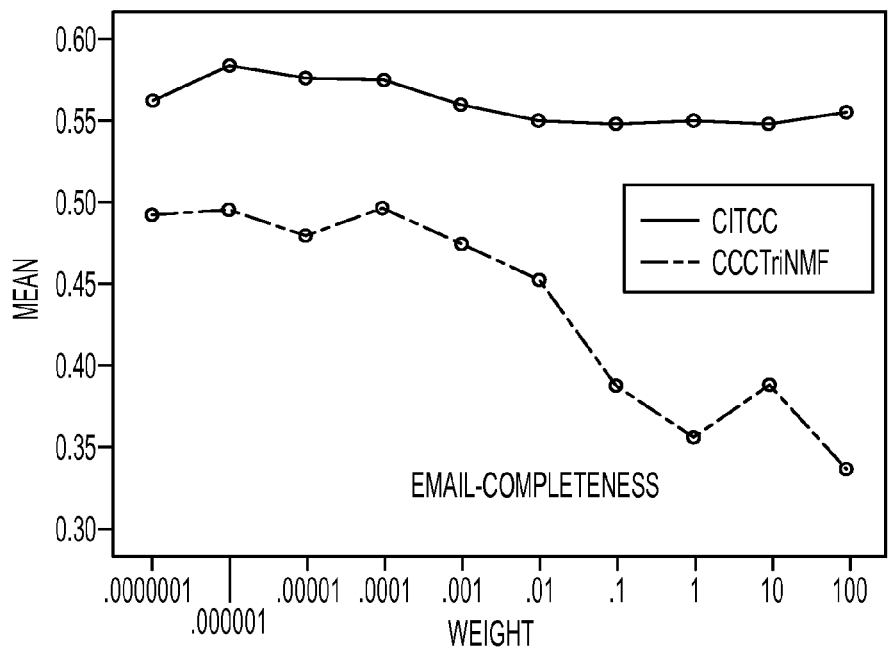
FIGS. 5A and 5B show the impact of constraint weight on topic completeness for two example datasets.
Figure 5B:
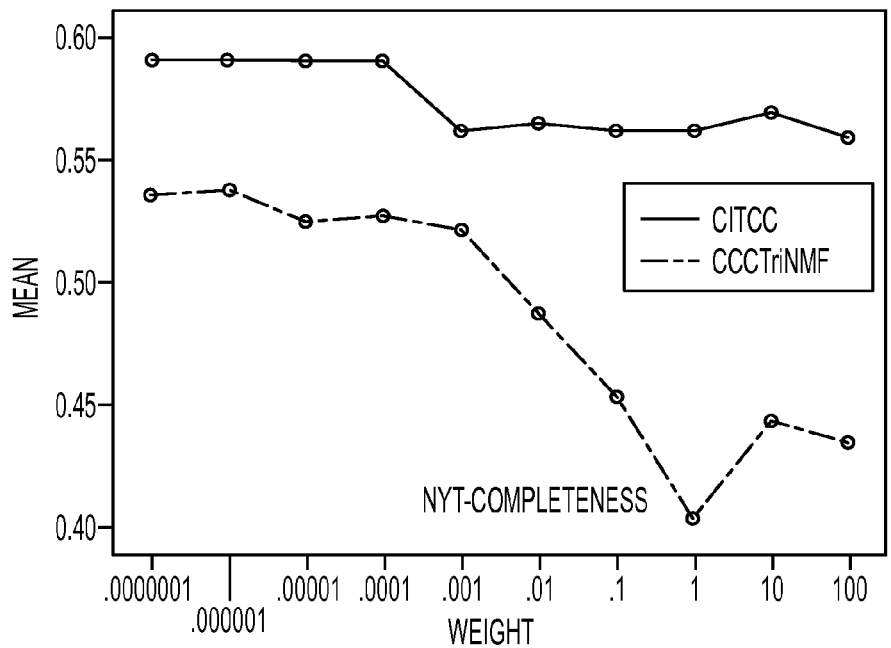

Since both CITCC and CCCTriNMF attempt to strike a balance between discovering coherent sub-topics and satisfying additional visual and temporal constraints, it was also investigated how constraint weight affects the results. In this experiment, the weights of must-links and cannot-links in CITCC and CCCTriNMF were varied from 0.0000001, the lowest, to 100, the highest. FIGS. 5A and 5B show the impact of constraint weight on topic completeness for both the example datasets. FIG. 5A illustrates the impact of constraint weight on topic completeness for email data. FIG. 5B shows the impact of constraint weight on topic completeness for news article data. As shown in Table 1, the topic completeness is mainly determined by the constrained clustering algorithms (i.e., CITCC or CCCTriNMF) and not sensitive to the two temporal alignment algorithms (CR or SL). The average topic completeness for each clustering method is shown, regardless of the alignment algorithm used. As shown in FIGS. 5A and 5B, when the weight of constraints increases, the topic completeness for CCCTriNMF deteriorates significantly. In contrast, CITCC holds its performance much better than CCCTriNMF.

Figure 6A:
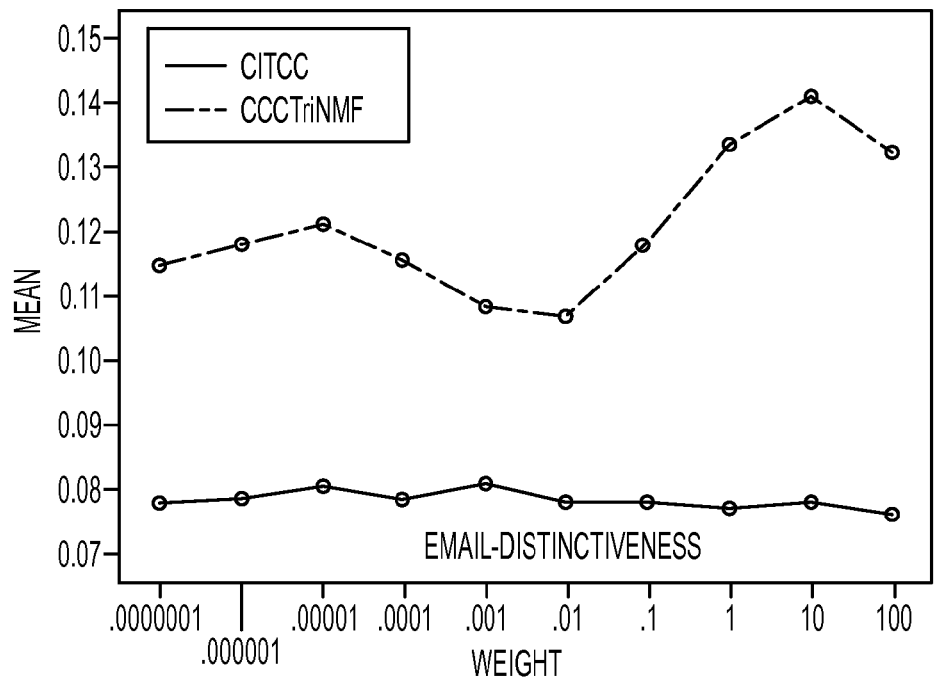
FIGS. 6A and 6B illustrate an impact of constraint weight on topic distinctiveness for two example datasets.
Figure 6B:
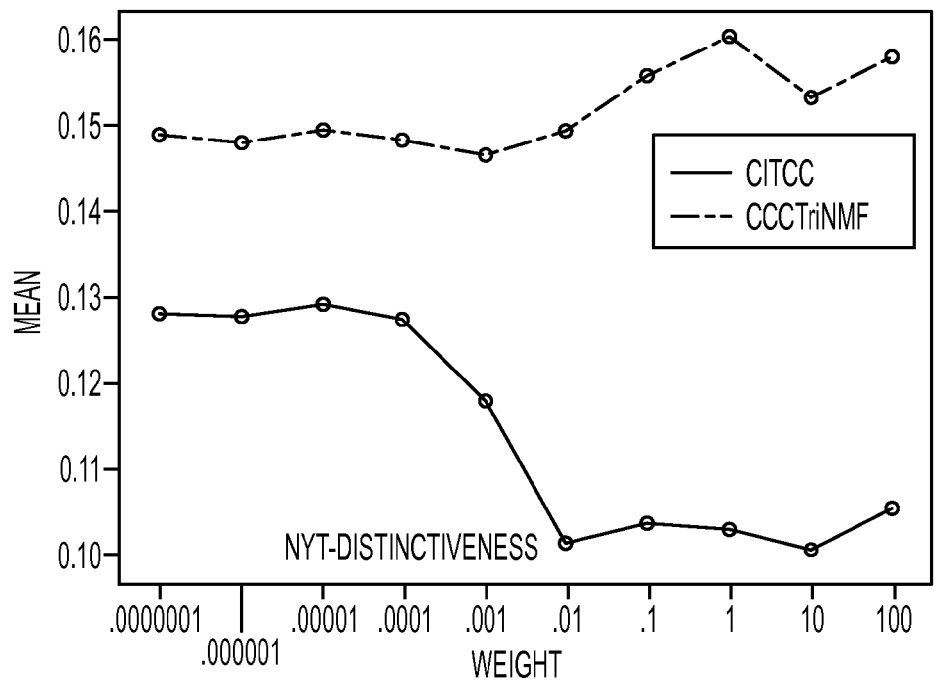

Similarly in FIGS. 6A and 6B, it is shown how constraint weight affects topic distinctiveness. FIG. 6A show an impact of constraint weight on topic distinctiveness for the example email data. FIG. 6B illustrates an impact of constraint weight on topic distinctiveness for the example news article data. Here, in CCCTriNMF (the green lines), when the constraint weight increases, the distinctiveness of the segments increases slightly. In contrast, for CITCC (the blue lines), increasing constraint weights seems having little impact on email data and negative impact on the news data on the topic distinctiveness.

Figure 7A:
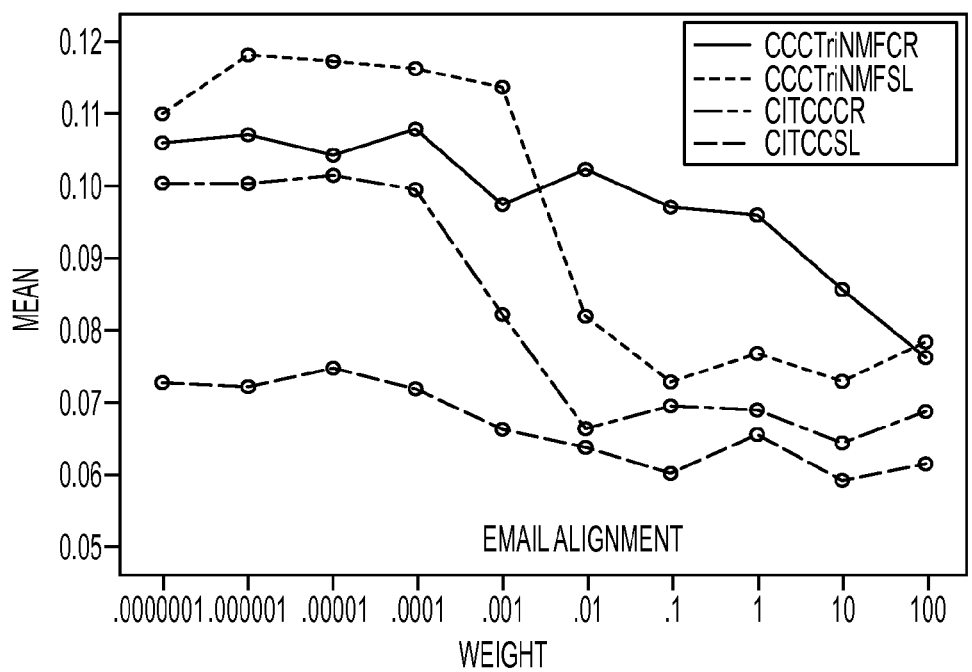
FIGS. 7A and 7B illustrate an impact of constraint weight on visual alignment for two example datasets.
Figure 7B:
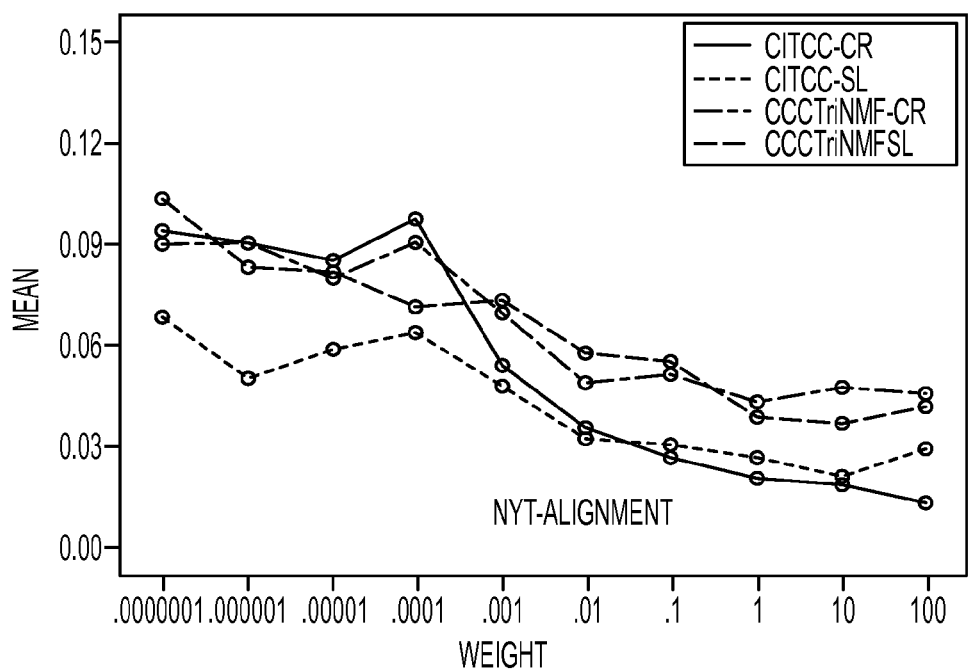

Moreover, the impact of constraint weight can be clearly observed in FIGS. 7A and 7B, which shows how visual alignment scores change with the constraint weights on two data sets. FIGS. 7A and 7B illustrate an impact of constraint weight on visual alignment. FIG. 7A shows an impact of constraint weight on visual alignment for the example email data. FIG. 7B illustrates an impact of constraint weight on visual alignment for the example news article data. Each curve in these graphs represents a combination of clustering (CITCC and CCCTriNMF) and temporal alignment algorithm (CR and SL). As shown in these graphics, when the weight increases, the alignment score decreases, indicating a better visual-temporal boundary alignment. This trend holds regardless of the data set, the clustering algorithm used, and the temporal alignment algorithm used.

These results are quite significant and demonstrate the effectiveness of the methodology of the present disclosure in satisfying visualization constraints. Moreover, among the four combinations that were investigated, CITCC-based algorithms outperformed CCCTriNMF-based ones; and the combination of CITCC_SL performed the best in most situations.

User Study

In addition to the above-described algorithmic experiments, a crowdsourced user study was also designed and conducted to evaluate the effect of the methodology of the present disclosure on user task performance. Specifically, it was evaluated how the methodology of the present disclosure aided users in their text analytic tasks against a baseline.

Data and Method

Figure 8A:
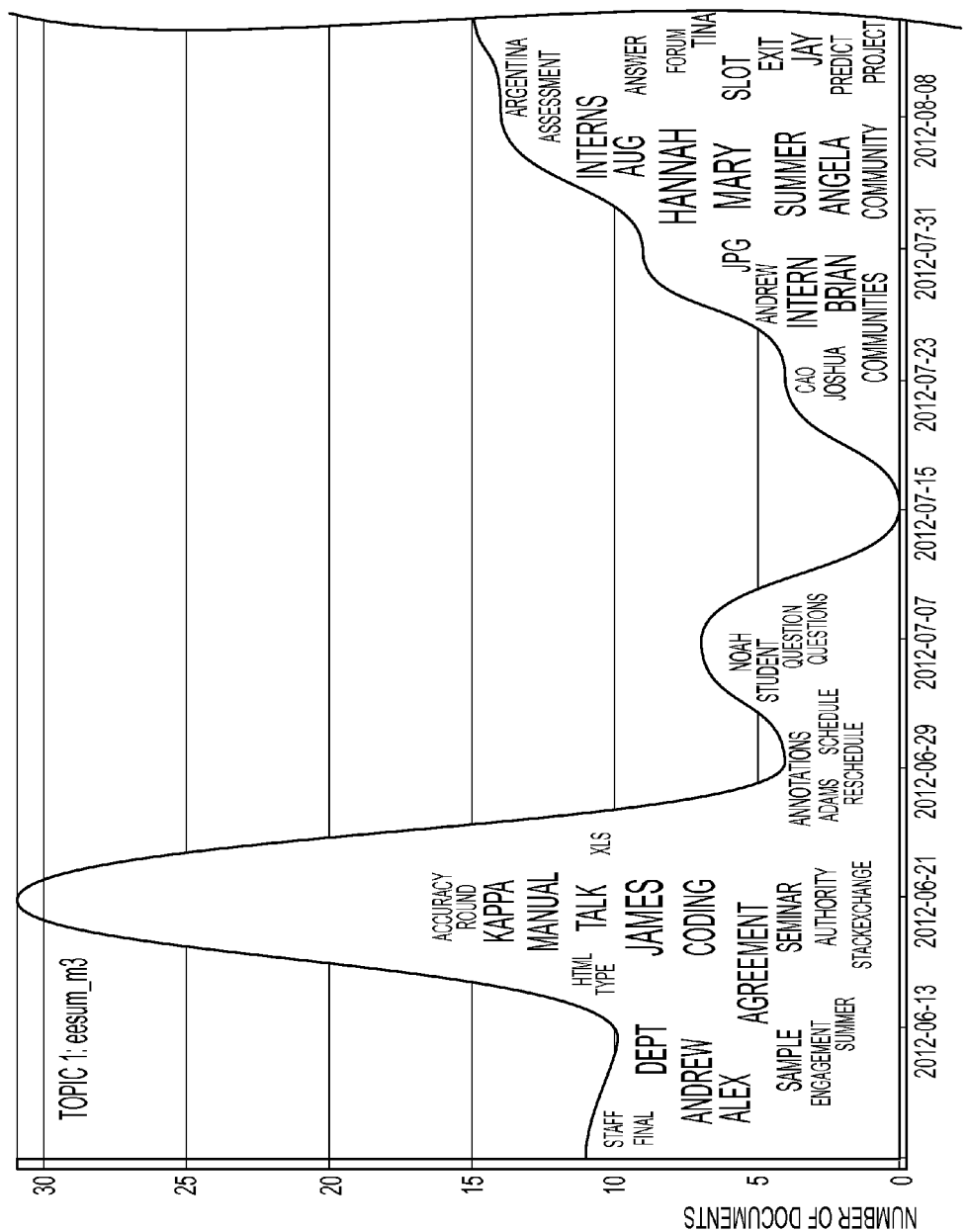
FIGS. 8A and 8B illustrates two visualizations used in a user study.
Figure 8A:
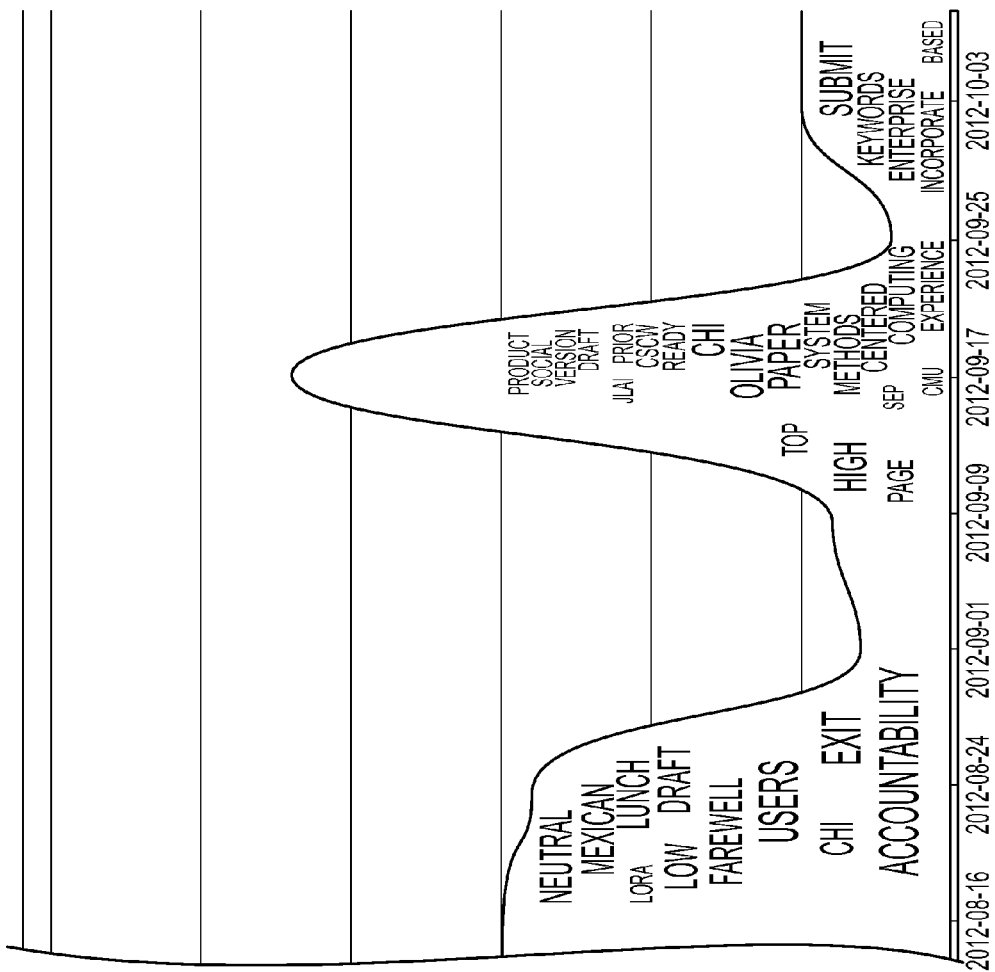
Figure 8B:
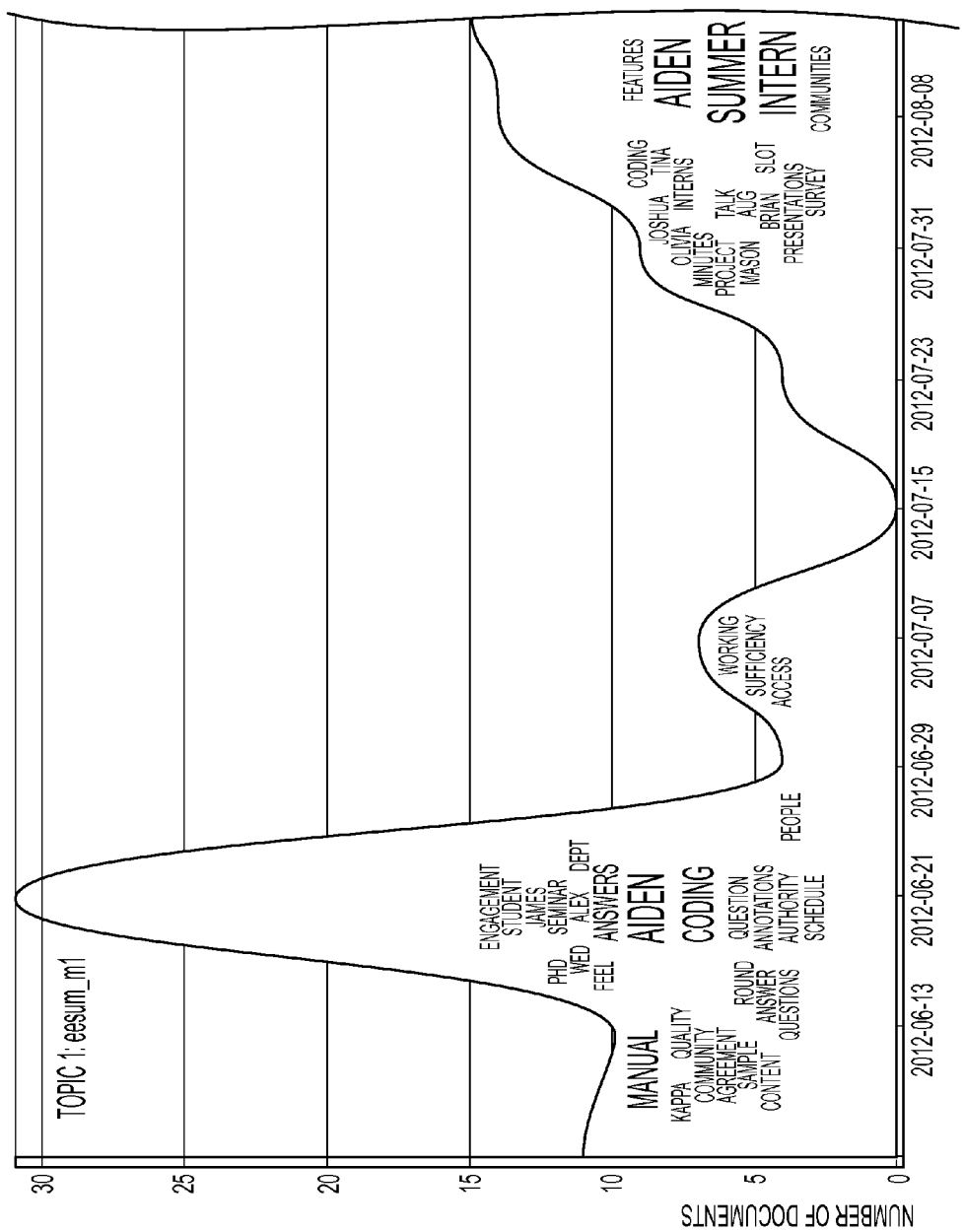
Figure 8B:
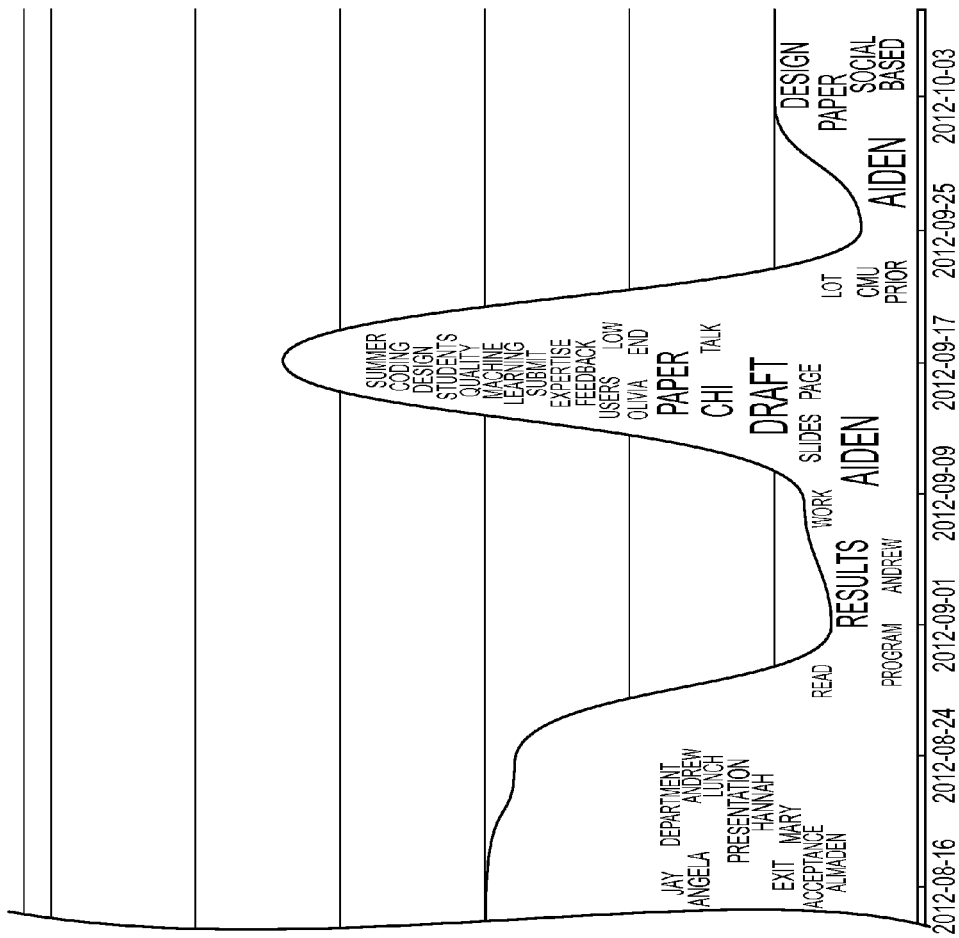

In this study, the email data set was used, since it was needed to compare the user task performance against the known ground truth. Moreover, focus was on testing fine-grained text analysis tasks, answering questions such as "who is most involved in Project X throughout the course" and "when did event Y occur". For this purpose, the system of the present disclosure created two visualizations. FIGS. 8A and 8B illustrates two visualizations used in a user study. FIG. 8A shows the temporal segmentation results of a topic produced by the baseline. FIG. 8B displays the results of the present disclosure's CITCC_SL algorithm, since it outperformed others in most cases in the above-described evaluation. There were 155 emails, dated from Jun. 1, 2012 to Oct. 10, 1012, related to the topic under study. The two visualizations were the same (e.g., size, color, and shape) except the location and content of the keyword clouds.

Two surveys were designed, one for each visualization. The surveys contained identical instructions and questions except the visualization. Each participant was first given a brief introduction to the task, including the data and the visualization. S/he was then instructed to view the visualization carefully to answer four multiple-choice questions, each of which is a text analytic task to gain an understanding of the selected topic.

A between-subject design was used and 50 assignments were sent for each survey on CROWDFLOWER, a crowd-sourcing platform. In this test, workers located in the U.S. only were recruited. Also, a worker was limited to work on only one of the two surveys once. 51 responses were collected for the baseline and 54 responses were collected for the methodology of the present disclosure.

Study Results and Analysis

From the collected survey results, two metrics were examined. One is task completion time, which was computed using the job start and submission time automatically recorded by CROWDFLOWER. The other is task success rate, measuring the percentage of correct answers that a participant produced. Overall, the participants who used FIG. 8B took longer (mean=4.8 minutes) to complete their tasks than those with the baseline (mean=4.2 minutes), although the difference was not significant ($p<0.08$ based on independent samples t-test). However, these participants achieved a much higher task success rate (mean=81% versus 18% for the baseline). The difference is statistically significant ($p<0.001$). This means that although those participants spent a bit more time, they were able to perform the analytic tasks much better using the visualization produced by the methodology of the present disclosure.

The effect of different tasks on the task success rate was further examined since the survey included two types of analytic tasks: (1) achieving an overall understanding of a topic, and (2) extracting specific aspects of a temporal sub-topic. It was found that the difference in task success rate was even greater in Type 1 task, 83% vs. 6% (e.g., "what are the main sub-topics in this project"), while the difference was smaller, 79% vs. 30%, for Type 2 task (e.g., "which event(s) occurred during the time frame X").

It is believed this variation is because the present disclosure's topic segmentation approach models latent semantics of the sub-topics and ensures that extracted temporal segments are semantically coherent. In contrast, the baseline relies on only a tf*idf based model, and important concepts (especially those appearing often in all the documents) might be discounted without showing up prominently in the display. Moreover, without a coherent topic model, the keywords selected by the baseline were disconnected. On the contrary, the present disclosure's methodology selected keywords that are semantically and temporally relevant to each other. The ability to capture the semantic, temporal, and visual coherence of sub-topics and their representative keywords produces an effective visualization for text analysis. Users often rely on the displayed word clouds to interpret and differentiate sub-topics. For example, FIG. 8B does a much better job than FIG. 8A to help users identify the three main sub-topics, manual coding in June, summer intern activities in July and August, and CHI paper writing in September. From this aspect, it shows the effectiveness of the present disclosure's method in helping users grasp the temporal evolution of a topic and capture its key transitions.

The present disclosure's methodology is extensibility, providing an advantage as new constraints can be easily incorporated in a topic analysis process.

Handling New Types of Constraints

It is quite straightforward for the methodology of the present disclosure to support new types of constraints, such as geo-spatial constraints. Assume that one wants to gauge the opinions posted on social media (e.g., TWITTER) toward the 2012 presidential candidates by geographical locations over time. In this case, one wants to group the posts not only based on their semantic themes and temporal localities, but also by the authors' geo-locations. To achieve this, the methodology of the present disclosure in one embodiment may incorporate must-links and cannot-links that indicate geographical relationships between two documents based on the locations of their authors. The methodology of the present disclosure in one embodiment can then perform topic analysis while balancing all the constraints, including the spatial constraints. Thus, the methodology of the present disclosure in one embodiment is applicable to new situations where new types of constraints need to be incorporated in topic analysis.

A constraint-based topic analysis approach to temporal topic segmentation in the present disclosure may create an effective, time-based visual summary of text. Given a topic derived from a set of text documents, the disclosed approach in one embodiment automatically splits it into a set of sub-topics (segments) spanning over multiple linear, non-overlapping temporal boundaries. In one embodiment, it does so by systematically incorporating and simultaneously satisfying a diverse set of constraints, including semantic, temporal, and visualization constraints. As a result, the present disclosure's approach in one embodiment produces semantically coherent temporal segments that capture significant topic transitions. Moreover, the identified temporal boundaries are aligned with the natural visual boundaries of a topic layer to optimize the use of space for displaying each word cloud, summarizing each sub-topic.

Extensive experiments were conducted to measure the performance of the present disclosure's methods by three objective metrics: topic completeness, topic distinctiveness, and visual segment alignment. The results have demonstrated the significant advantage of the present disclosure's methods over an established baseline. In particular, present disclosure's Constrained Information-Theoretic Co-Clustering (CITCC) topic analysis with the Smoothing Label temporal alignment approach performs the best in most cases. Furthermore, a crowdsourced user study also demonstrates the effectiveness of the methodology of the present disclosure in aiding users completing fine-grained text analysis tasks.

The applicants in this disclosure have recognized that temporal segmentation of a topic across a set of heterogeneous documents (or data) has not been addressed before. Moreover, one should consider visual constraints during topic segmentation to ensure an effective temporal visualization of the derived segments. A methodology was described that finds documents related to a topic, segment documents in a given topic over time to create an effective time-based visual text summary, identify and output proper time frames that best segment a topic by satisfying a set of semantic, temporal and visualization constraints. Unlike the existing systems, a systematic approach is developed to temporal topic segmentation by balancing a diverse set of constraints.

Figure 10:
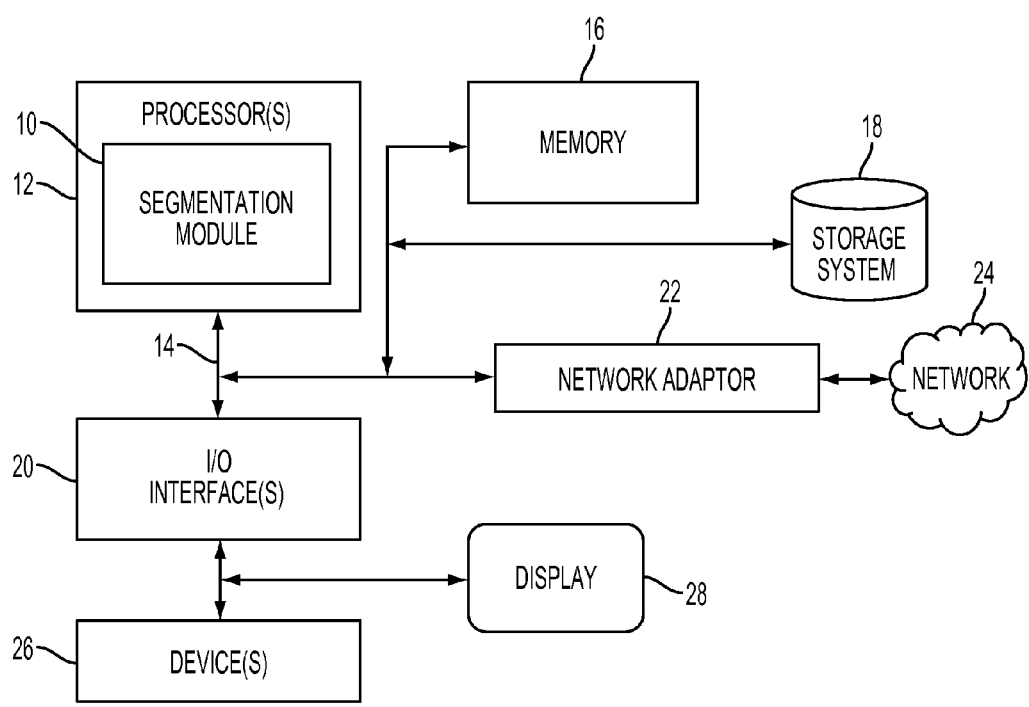
FIG. 10 illustrates a schematic of an example computer or processing system that may implement the topic-based temporal segmentation system in one embodiment of the present disclosure.

FIG. 10 illustrates a schematic of an example computer or processing system that may implement the topic-based temporal segmentation system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 10 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a segmentation module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of visualizing content change of a data collection over time, comprising:
   receiving one or more topics derived from the data collection;
   extracting a set of documents relevant to each topic from the data collection;
   segmenting each topic into multiple non-overlapping temporal segments, the segmenting comprising:
   generating temporal and visual constraints;
   deriving from the set of documents a set of document clusters that satisfy the temporal and visual constraints, a document cluster in the set of document clusters identified with a sub-topic; and
   determining a temporal segment boundary associated with said document cluster, wherein the temporal segment boundary identifies a temporal segment for the sub-topic;
   selecting a set of representative keywords from the document cluster to summarize the temporal segment; and
   generating a time-based, interactive visual summary of the data collection.

2. The method of claim 1, wherein the data collection comprises a text collection.

3. The method of claim 1, wherein the generating temporal and visual constraints comprises:
   adding a cannot-link between a document pair in the set of documents, in response to determining documents of the document pair fall in different visual segments;
   adding a must-link between two documents in the set of documents, in response to determining that a temporal distance between the two documents is within a first threshold, and in response to determining that the temporal distance between the two documents is above a second threshold, adding a cannot-link between the two documents.

4. The method of claim 3, wherein the first threshold and the second threshold are defined empirically based on one or more properties of the data collection.

5. The method of claim 1, wherein the deriving the set of document clusters comprises performing a constraint-based topic analysis applying constrained clustering algorithm with the generated temporal and visual constraints.

6. The method of claim 5, wherein the constrained clustering algorithm comprises constrained information-theoretic co-clustering, or constrained co-clustering with non-negative matrix trifactorization, or constrained K-means, or constrained LDA or combinations thereof.

7. The method of claim 1, wherein the determining a temporal segment boundary comprises:
   extracting a temporal center and a temporal radius associated with each derived document cluster;
   sorting the document clusters on a time line based on the temporal center associated with respective said each derived document cluster; and
   determining the temporal segment boundary between two adjacent clusters based on the temporal radius associated with respective each of the two adjacent clusters.

8. The method of claim 7, wherein the temporal center is defined as a median time stamp after sorting all documents in the document cluster on a time line, wherein first half of the documents fall before the temporal center and second half of the documents fall after the temporal center.

9. The method of claim 7, wherein the temporal radius is used to define a range radiating from the temporal center, wherein a predefined number of documents in the document cluster are within the range.

10. The method of claim 7, wherein the temporal segment boundary between the two adjacent clusters are determined by computing, $$b_{1,2} = c_1 + \frac{r_1}{r_1 + r_2} \times d,$$

wherein
   $c_1$ represent the temporal center of first cluster of the two adjacent clusters,
   $r_1$ represents the temporal radius of the first cluster of the two adjacent clusters,
   $r_2$ represents the temporal radius of second cluster of the two adjacent cluster, and
   d represents a given time distance between the temporal centers of the two adjacent clusters.

11. The method of claim 7, further comprising:
   removing a document cluster determined to have a cluster size less than a predefined size.

12. The method of claim 1, wherein the determining a temporal segment boundary comprises:
   sorting all documents in the set of document clusters on a timeline based on time stamps associated with the documents;
   employing a sliding window of size N to examine N documents at a time;
   identifying one or more documents from the examined documents whose cluster labels do not conform to a majority cluster label; and
   reassigning the identified one or more documents to the majority cluster label within the sliding window,
   wherein the temporal boundary is determined in response to identifying a change of cluster labels between two adjacent documents on the time line.

13. The method of claim 1, wherein the selecting a set of representative keywords comprises:
   ranking words in the document cluster based on a computing algorithm; and
   selecting top K words based on the ranking as the representative keywords, wherein K is a predefined number;
   wherein if constrained information-theoretic co-clustering is used as the constrained clustering algorithm, the computing algorithm comprises, for each word $v_i$ in the documents in segment S, computing a rank of the word $r_{v_i}$ by $$r_{v_i \in S} = \sum_{k_v} q(\hat{d}_{k_d}, \hat{v}_{k_v}) q(v_i \mid \hat{v}_{k_v}),$$

wherein $\hat{d}_{k_d}$ is the document cluster associated with segment S,
   $q(\hat{d}_{k_d}, \hat{v}_{k_v})$ is a probability of a word cluster $\hat{v}_{k_v}$, $k_v$=1, 2, 3 . . . , K, associated with the document cluster $\hat{d}_{k_d}$, and
   $q(v_i \mid \hat{v}_{k_v})$ is a probability a word $v_i$ is associated with the word cluster $\hat{v}_{k_v}$; and
   wherein if constrained co-clustering with non-negative matrix trifactorization is used as the constrained clustering algorithm, the computing algorithm comprises, computing a rank of a word $v_i$ by $r_{v_i} = [S \cdot G_2^T]_{k,i}$, wherein S is a cluster center matrix of a matrix-factorization-based constrained co-clustering objective function, $G_2^T$ is a transpose of a word cluster indicator matrix, k is a cluster label associated with current segment, and i is a word index of $v_i$.

14. A system for visualizing content change of a data collection over time, comprising:
   a processor;
   a document pre-processing module operable to execute on the processor, and further operable to extract text and associated meta data from a collection of documents;
   a topic summarization module operable to automatically extract a set of topics based on the extracted text and associated meta data;
   a topic segmentation module operable to split a topic in the set of topics into multiple, non-overlapping temporal segments, wherein content for visualization is generated; and
   a text visualization module operable to generate a time-based, interactive visual text summary based on the content,
   wherein the topic segmentation module is operable to generate temporal and visual constraints, the topic segmentation module further operable to derive from the collection of documents a set of document clusters that satisfy the temporal and visual constraints, a document cluster in the set of document clusters identified with a sub-topic, the topic segmentation module further operable to determine a temporal segment boundary associated with said document cluster, wherein the temporal segment boundary identifies a temporal segment for the sub-topic, the topic segmentation module further operable to select a set of representative keywords from the document cluster to summarize the temporal segment.

15. The system of claim 14, wherein the topic segmentation module generates the temporal and visual constraints by adding a cannot-link between a document pair in the set of documents, in response to determining documents of the document pair fall in different visual segments; and adding a must-link between two documents in the set of documents, in response to determining that a temporal distance between the two documents is within a first threshold, and in response to determining that the temporal distance between the two documents is above a second threshold, adding a cannot-link between the two documents.

16. The system of claim 14, wherein the topic segmentation module derives the set of document clusters by performing a constraint-based topic analysis applying constrained clustering algorithm with the generated temporal and visual constraints.

17. The system of claim 14, wherein the topic segmentation module determines a temporal segment boundary by at least:
   extracting a temporal center and a temporal radius associated with each derived document cluster;
   sorting the document clusters on a time line based on the temporal center associated with respective said each derived document cluster; and
   determining the temporal segment boundary between two adjacent clusters based on the temporal radius associated with respective each of the two adjacent clusters.

18. The system of claim 14, wherein the topic segmentation module determines a temporal segment boundary by at least:
   sorting all documents in the set of document clusters on a timeline based on time stamps associated with the documents;
   employing a sliding window of size N to examine N documents at a time;
   identifying one or more documents from the examined documents whose cluster labels do not conform to a main cluster; and
   reassigning the identified one or more documents to the main cluster within the sliding window,
   wherein the temporal boundary is determined in response to identifying a change of cluster labels between two adjacent documents on the time line.

19. A non-transitory computer readable storage medium storing a program of instructions executable by a machine to perform a method of visualizing content change of a data collection over time, comprising:
   receiving a topic derived from the data collection;
   extracting a set of documents relevant to the topic from the data collection;
   segmenting the topic into multiple non-overlapping temporal segments, the segmenting comprising:
      generating temporal and visual constraints;
      deriving from the set of documents a set of document clusters that satisfy the temporal and visual constraints, a document cluster in the set of document clusters identified with a sub-topic; and
      determining a temporal segment boundary associated with said document cluster, wherein the temporal segment boundary identifies a temporal segment for the sub-topic;
      selecting a set of representative keywords from the document cluster to summarize the temporal segment; and
   generating a time-based, interactive visual summary of the data collection.

20. The non-transitory computer readable storage medium of claim 19, wherein the deriving the set of document clusters comprises performing a constraint-based topic analysis applying constrained clustering algorithm with the generated temporal and visual constraints.

21. The non-transitory computer readable storage medium of claim 20, wherein the generating temporal and visual constraints comprises:
   adding a cannot-link between a document pair in the set of documents, in response to determining documents of the document pair fall in different visual segments;
   adding a must-link between two documents in the set of documents, in response to determining that a temporal distance between the two documents is within a first threshold, and in response to determining that the temporal distance between the two documents is above a second threshold, adding a cannot-link between the two documents.

22. The non-transitory computer readable storage medium of claim 19, wherein the determining a temporal segment boundary comprises:
   extracting a temporal center and a temporal radius associated with each derived document cluster;
   sorting the document clusters on a time line based on the temporal center associated with respective said each derived document cluster; and
   determining the temporal segment boundary between two adjacent clusters based on the temporal radius associated with respective each of the two adjacent clusters.

23. The non-transitory computer readable storage medium of claim 22, wherein the temporal segment boundary between the two adjacent clusters are determined by computing, $$b_{1,2} = c_1 + \frac{r_1}{r_1 + r_2} \times d,$$

wherein
- $c_1$ represent the temporal center of first cluster of the two adjacent clusters,
- $r_1$ represents the temporal radius of the first cluster of the two adjacent clusters,
- $r_2$ represents the temporal radius of second cluster of the two adjacent cluster, and
- d represents a given time distance between the temporal centers of the two adjacent clusters.

24. The non-transitory computer readable storage medium of claim 19, wherein the determining a temporal segment boundary comprises:
- sorting all documents in the set of document clusters on a timeline based on time stamps associated with the documents;
- employing a sliding window of size N to examine N documents at a time;
- identifying one or more documents from the examined documents whose cluster labels do not conform to a main cluster; and
- reassigning the identified one or more documents to the main cluster within the sliding window,
- wherein the temporal boundary is determined in response to identifying a change of cluster labels between two adjacent documents on the time line.

25. The non-transitory computer readable storage medium of claim 19, wherein if Constrained Co-Clustering with Non-negative Matrix Tri-Factorization (CCCTriNMF) is used for document clustering,
the selecting a set of representative keywords comprises:
- ranking words in the document cluster based on a computing algorithm; and
- selecting top K words based on the ranking as the representative keywords, wherein K is a predefined number;
- wherein if constrained information-theoretic co-clustering is used as the constrained clustering algorithm, the computing algorithm comprises, for each word $v_i$ in the documents in segment S, computing a rank of the word $r_{v_i}$ by $$r_{v_i \in S} = \sum_{k_v} q(\hat{d}_{k_d}, \hat{v}_{k_v}) q(v_i \mid \hat{v}_{k_v}),$$

wherein $\hat{d}_{k_d}$ is the document cluster associated with segment S,
$q(\hat{d}_{k_d}, \hat{v}_{k_v})$ is a probability of a word cluster $\hat{v}_{k_v}$, $k_v$=1, 2, 3 ..., K, associated with the document cluster $\hat{d}_{k_d}$, and
$q(v_i|\hat{v}_{k_v})$ is a probability a word $v_i$ is associated with the word cluster $\hat{v}_{k_v}$; and
wherein if constrained co-clustering with non-negative matrix trifactorization is used as the constrained clustering algorithm, the computing algorithm comprises, computing a rank of a word $v_i$ by $r_{v_i} = [S \cdot G_2^T]_{k,i}$,
wherein S is a cluster center matrix of a matrix-factorization-based constrained co-clustering objective function, $G_2^T$ is a transpose of a word cluster indicator matrix, k is a cluster label associated with current segment, and i is a word index of $v_i$.

* * * * *